(12) United States Patent
Corts et al.

(10) Patent No.: US 8,396,100 B2
(45) Date of Patent: Mar. 12, 2013

(54) SYSTEM AND METHOD FOR TRANSMITTING DIGITAL MULTIMEDIA DATA WITH ANALOG BROADCAST DATA

(75) Inventors: David Corts, Nashville, TN (US); Bryce Wells, Old Hickory, TN (US); Paul Signorelli, New York, NY (US); Lee Hunter, Darien, CT (US); Terrance Snyder, Washingtonville, NY (US)

(73) Assignee: Impulse Radio, Inc., Larchmont, NY (US)

( * ) Notice: Subject to any disclaimer, the term of this patent is extended or adjusted under 35 U.S.C. 154(b) by 2441 days.

(21) Appl. No.: 10/484,518

(22) PCT Filed: Jul. 17, 2002

(86) PCT No.: PCT/US02/22898
§ 371 (c)(1),
(2), (4) Date: Dec. 2, 2004

(87) PCT Pub. No.: WO03/009592
PCT Pub. Date: Jan. 30, 2003

(65) Prior Publication Data
US 2005/0100113 A1 May 12, 2005

Related U.S. Application Data

(63) Continuation-in-part of application No. 09/839,451, filed on Apr. 20, 2001, now Pat. No. 7,908,172, which is a continuation-in-part of application No. 09/802,469, filed on Mar. 9, 2001, now abandoned.

(60) Provisional application No. 60/306,080, filed on Jul. 17, 2001, provisional application No. 60/188,050, filed on Mar. 9, 2000, provisional application No. 60/346,785, filed on Jan. 7, 2002, provisional application No. 60/346,784, filed on Jan. 7, 2002.

(51) Int. Cl.
*H04B 1/38* (2006.01)
*H04L 5/16* (2006.01)

(52) U.S. Cl. ........ 375/220; 375/219; 375/222; 375/225; 375/226

(58) Field of Classification Search .................. 375/265, 375/269, 341; 705/40
See application file for complete search history.

(56) References Cited

U.S. PATENT DOCUMENTS

| | | | | |
|---|---|---|---|---|
| 4,477,809 A * | 10/1984 | Bose | ............ | 340/10.41 |
| 4,788,543 A * | 11/1988 | Rubin | ............ | 340/7.21 |
| 5,537,549 A * | 7/1996 | Gee et al. | ............ | 709/224 |
| 5,584,050 A * | 12/1996 | Lyons | ............ | 455/2.01 |
| 5,615,227 A * | 3/1997 | Schumacher et al. | ........ | 375/142 |
| 5,701,593 A | 12/1997 | Storz et al. | | |
| 5,757,854 A * | 5/1998 | Hunsinger et al. | ............ | 375/260 |
| 5,826,165 A * | 10/1998 | Echeita et al. | .................. | 725/22 |
| 6,108,328 A * | 8/2000 | Ranta et al. | .................. | 370/345 |
| 6,173,271 B1 * | 1/2001 | Goodman et al. | ............ | 705/40 |
| 6,192,340 B1 * | 2/2001 | Abecassis | ............ | 704/270 |
| 6,246,672 B1 * | 6/2001 | Lumelsky | ............ | 370/310 |
| 6,721,337 B1 * | 4/2004 | Kroeger et al. | ............ | 370/477 |
| 6,957,041 B2 * | 10/2005 | Christensen et al. | ........ | 455/3.06 |

(Continued)

*Primary Examiner* — Daniel Washburn
*Assistant Examiner* — Qutbuddin Ghulamali
(74) *Attorney, Agent, or Firm* — Withrow & Terranova PLLC; Taylor M. Davenport

(57) ABSTRACT

A method and system for the transmission of digital data (210) over existing analog radio frequencies (230) is presented, wherein the digital data may include audio data, visual data or audio-visual data for presentation either with analog broadcast data or at a selectable time. The digital data may be transmitted over a plurality of sub-channels that have varying degrees or reliability (250). A "quality-of-service" process manages the transmission of digital data over various sub-channels based on the reliability of the sub-channel, the amount of digital data and the type of digital data to be transmitted. The digital data may further be encrypted and authenticated.

18 Claims, 39 Drawing Sheets

U.S. PATENT DOCUMENTS

| | | | |
|---|---|---|---|
| 7,099,348 B1 * | 8/2006 | Warwick | 370/442 |
| 7,248,602 B2 * | 7/2007 | Robbins et al. | 370/465 |
| 7,693,508 B2 * | 4/2010 | Leung et al. | 455/412.1 |
| 2002/0010789 A1 * | 1/2002 | Lord | 709/231 |
| 2003/0023986 A1 * | 1/2003 | Honmura | 725/134 |
| 2005/0204385 A1 * | 9/2005 | Sull et al. | 725/45 |

* cited by examiner

DATA SERVICE INFORMATION

| DESCRIPTION | BIT POSITION | ABSTRACT |
|---|---|---|
| SYNCHRONIZATION | 0 - 15 | A 16 BIT WORD THAT MAY BE USED TO CALL THE CUE THE DATA ON DEMAND |
| SENDER TIME STAMP | 16 - 47 | A 32 BIT WORD REPRESENTING THE TIME THE DATA WAS SENT FROM THE BROADCASTER. THIS TIME MAY BE REPRESENTED IN MILLISECONDS. |
| RECEIVER TIME STAMP | 48 - 79 | A 32 BIT WORD REPRESENTING THE TIME LAST TIME DATA WAS RENDERED/EXECUTED BY THE RECEIVER. |
| DOMAIN ID | 80 - 111 | 4 BYTES THAT MAY BE USED BY THE BROADCASTER TO IDENTIFY THE A DOMAIN ID OF THE SENDER. THE DATA SHOULD BE ABLE TO TRANSLATE TO THE EQUIVALENT OF 4 CALL LETTERS. |
| CONTENT RATING | 112 - 115 | BITS THAT MAY BE USED TO CONTENT RATING, E.G. 0001 - ALL AUDIENCES THRU 1111 - ADULTS ONLY |
| CONTENT CATEGORY | 116 - 154 | 5 GROUPS OF 8 BITS THAT MAY BE USED TO CATEGORIZE THE DATA E.G., 00001000 - SPORTS; 00000001 - MLB; 00000001 - YANKEES; 00000000 - N/A 00000000 - N/A |
| FILESIZE NUMBER | 155 - 170 | A 16 BIT WORD THAT MAY BE USED TO DETERMINE THE MAGNITUDE OF THE FILE SIZE BITS, (00 - BITS, 01 - BYTES, 10 - KILOBYTES, 11 - MEGABYTES) |
| FILESIZE MAGNITUDE | 171 - 172 | A 2 BIT WORD THAT MAY BE USED TO DETERMINE THE MAGNITUDE OF THE FILE SIZE BITS, (00 - BITS, 01 - BYTES, 10 - KILOBYTES, 11 - MEGABYTES) |
| RESERVED BIT | 173 - 204 | 32 BIT RESERVED FOR FUTURE USE |
| STATUS BITS | 205 - 236 | 32 INDIVIDUAL BITS THAT THAT THE RECEIVER MAY USE TO AS STATUS FLAGS FOR THE DATA |
| EVENT ID | 237 - 252 | 16 BITS RESERVED TO IDENTIFY THE EVENT CUE MESSAGE USED TO SYNCHRONIZE THE DATA WITH THE AUDIO |
| EVENT INDICATOR | 253 - 268 | 16 BITS USED TO IDENTIFY A POSITION WITHIN AN EVENT CUE MESSAGE THAT WILL START THIS USER DATA SHOULD BE PROCESSING |
| GROUP ID | 269 - 284 | 16 BIT WORD THAT MAY BE USED TO GROUP THAT USER DATA BLOCK WITH THE DATA IN ANOTHER USER DATA BLOCK |
| MIME TYPE | 285 - 300 | 16 BIT WORD THAT MAY BE USED TO IDENTIFY THE MIME TYPE OF THE USER DATA |
| USER DATA | 301 - | THE RENDERABLE/EXECUTABLE DATA |

SYNCHRONIZATION CUE 402
SENDER TIME STAMP 404
RECEIVER TIME STAMP 406
DOMAIN ID 408
CONTENT RATING 410
CONTENT CATEGORY LEVEL 1 THROUGH 5 412
FILE SIZE NUMBER 414
FILE SIZE MAGNITUDE 418
STATUS FLAGS RESERVED 420
STATUS FLAGS 422
EVENT ID 424
EVENT INDICATOR 426
GROUP ID 428
MIME TYPE 430
USER DATA 432

*FIG. 4*

AUTHENTICATION HEADER ROW

| AUTHENTICATION MODE 1202 | TIMESTAMP 1206 | NONCE VALUE 1 1210 | NONCE VALUE 2 1214 | HASH ALGORITHM ID 1218 | KEY LENGTH 1224 | PUBLIC KEY 1228 | DS LENGTH 1232 | DIGITAL SIGNATURE 1236 |
|---|---|---|---|---|---|---|---|---|
| MODE OF AUTHENTICATION | TIME UP TO WHICH THE SIGNATURE IS VALID | RANDOMLY GENERATED TEMPORARY VALUE | SECOND VALUE USED FOR CERTAIN MODES | CODE TO IDENTIFY SIGNATURE GENERATING ALGORITHM | LENGTH OF PUBLIC KEY | KEY USED TO ENCRYPT SIGNATURE | LENGTH OF DIGITAL SIGNATURE | RECIPIENT'S IDENTITY SIGNED BY SENDER |

AUTHENTICATION HEADER EXAMPLE

| 1204 | 1208 | 1212 | 1216 | 1220 | 1226 | 1230 | 1234 | 1238 |
|---|---|---|---|---|---|---|---|---|
| 01 AUTH. MODE $B_{i+0} - B_{i+1}$ | 0100...1111 TIMESTAMP $B_{i+2} - B_{i+34}$ | 1011...0000 NONCE VALUE 1 $B_{i+35} - B_{i+50}$ | 1101...0001 NONCE VALUE 2 $B_{i+51} - B_{i+65}$ | 0100 HASH ALGORITHM $B_{i+66} - B_{i+69}$ | 0100 0110 KEY LENGTH $B_{i+70} - B_{i+77}$ | 1010...0101 PUBLIC KEY $B_{i+78} - B_{i+78+j}$ | 1001 1100 DS LENGTH $B_{i+78+j+1} - B_{i+78+j+8}$ | 0110...1000 DIGITAL SIGNATURE $B_{i+78+j+9} - B_{i+78+j+k}$ | j = PUBLIC KEY LENGTH IN BITS
k = DIGITAL SIGNATURE LENGTH IN BITS

FIG. 12

Class Tree Deprecated Index Help
PREV CLASS  NEXT CLASS                           FRAMES  NO FRAMES
SUMMARY INNER I FIELD I CONSTR I METHOD          DETAIL FIELD I CONSTR I METHOD

Interface QoSManager  1610

--- public interface QoSManager

Handles the creation of subchannels and the level of service for a subchannel. It is also the point of entry for data services requiring a handle to sub-channels to send data

| Method Summary | |
|---|---|
| SubChannel | getSubChannel (int QoSLevel)  1620<br>Returns a subchannel of a specific QoSLevel returns null if the specific channel cannot be returned |

| Method Detail |
|---| getSubChannel  1630 public SubChannel getSubChannel (int QoSLevel)
                throws java.lang.Exception Returns a subchannel of a specific QoSLevel returns null if the specific channel cannot be returned
    Throws:
        java.lang.Exception - if the Subchannel cannot be acquired.

---

Class Tree Deprecated Index Help
PREV CLASS  NEXT CLASS                           FRAMES  NO FRAMES
SUMMARY INNER I FIELD I CONSTR I METHOD          DETAIL FIELD I CONSTR I METHOD

*FIG. 16*

Class Tree Deprecated Index Help
PREV CLASS NEXT CLASS                              FRAMES NO FRAMES
SUMMARY INNER | FIELD | CONSTR | METHOD           DETAIL FIELD | CONSTR | METHOD

Interface SubCarrier 1702 public interface SubCarrier

The SubCarrier class is the lowest level (aside from the physical layer) of an IBOC transmission. Multiple SubCarriers are grouped together to form a SubChannel. SubCarriers have a Quality of Service (QoS) rating that describes the reliability of the carrier. Generally, the higher the QoS rating, the lower the reliability of the carrier.

| Method Summary | |
|---|---|
| void | clear () 1704<br>Returns the carrier to "pristine" condition for return to the pool. |
| int | getQoSRating () 1706<br>Gets the Quality of Service (QoS) rating of the SubCarrier |
| int | read (byte [] b, int len)  1708<br>Reads up to len bytes off of the carrier into byte-array b. |
| int | write (byte [] b)  1710<br>Writes up to b.length bytes on the carrier from byte-array b. |

| Method Detail |
|---| getQoSRating 1712 public int getQoSRating ()
    Gets the Quality of Service (QoS) rating of the SubCarrier
    Returns:
        the carrier's rating read 1714 public int read(byte[] b.
              int len)

FIG. 17A

Reads up to len bytes off of the carrier into byte-array b
Parameters:
    b - array to be populated with the bytes read
    len - number of bytes requested to be read
Returns:
    the number of bytes actually read

--- write 1716 public int write (byte[] b)
    Writes up to b.length bytes on to the carrier from byte-array b.
    Parameters:
        b - an array of bytes to be written
    Returns:
        the number of bytes actually written

--- clear 1718 public void clear ()
    Returns the carrier to "pristine" condition for return to the pool.

---

Class Tree Deprecated Index Help
PREV CLASS NEXT CLASS                    FRAMES NO FRAMES
SUMMARY INNER I FIELD I CONSTR I METHOD        DETAIL FIELD I CONSTR I METHOD

*FIG. 17B*

Class Tree Deprecated Index Help
PREV CLASS  NEXT CLASS                                    FRAMES  NO FRAMES
SUMMARY INNER I FIELD I CONSTR I METHOD                   DETAIL FIELD I CONSTR I METHOD

Interface SubCarrierFactory 1802 public interface SubCarrierFactory

An instance of SubCarrierFactory is used to create SubCarriers that comprise a SubChannel.

| Method Summary | |
|---|---|
| SubCarrier | newSubCarrier (int rating)  1804<br>Create a new SubCarrier with the specified Quality of Service (QoS) rating. |

| Method Detail |
|---| newSubCarrier 1806 public SubCarrier newSubCarrier (int rating)
    Create a new SubCarrier with the specified Quality of Service (QoS) rating.
    Parameters:
        rating - the level of reliability
    Returns:
        a SubCarrier object with the specified rating

Class Tree Deprecated Index Help
PREV CLASS  NEXT CLASS                                    FRAMES  NO FRAMES
SUMMARY INNER I FIELD I CONSTR I METHOD                   DETAIL FIELD I CONSTR I METHOD

*FIG. 18*

Class Tree Deprecated Index Help
PREV CLASS  NEXT CLASS                                    FRAMES  NO FRAMES
SUMMARY INNER | FIELD | CONSTR | METHOD             DETAIL FIELD | CONSTR | METHOD

Interface SubCarrierPool  1902

--- public interface SubCarrierPool

The interface by which subcarriers can be locked/unlocked for use by a subchannel. The storage of a predefined amount of subcarrier objects in this pool prevents unnecessary reconstruction and garbage collection. All implementing classes should provide at least one constructor with a single argument of type int and constructs this many SubCarrier objects to hold in a Collection.

| Method Summary | |
|---|---|
| void | checkIn (SubCarrier subc)  1904<br>A method to notify the pool that subc is available for checkout. |
| SubCarrier | checkOut (int qosRating)  1906<br>Returns a Subcarrier object with a quality of service rating matching qosRating after removing it from the pool. |
| int[ ] | getAvailableRatings ()  1908<br>Returns an array of ints matching the quality of service of each subcarrier currently in the pool |
| int | getCount ( )  1910<br>Returns the size of the pool |

| Method Detail |
|---| checkOut public SubCarrier checkOut (int qosRating)  1912
            throws java.lang.Exception
    Returns a Subcarrier object with a quality of service rating matching qosRating after removing it from the pool
    Parameters:
        qosRating - the quality of service rating of the subcarrier
    Throws:
        java.lang.Exception - when a subcarrier with qosRating is unavailable

FIG. 19A checkIn public void checkIn (SubCarrier subc) 1914
                throws java.lang.Exception A method to notify the pool that subc is available for checkout
    Parameters:
        subc - the subcarrier ready to be checked in
    Throws:
        java.lang.Exception - when a subcarrier of the same quality of service exists
        in the pool already

--- getAvailable Ratings 1916 public int [ ] getAvailableRatings ( )

Returns an array of ints matching the quality of service of each subcarrier currently
    in the pool.

--- getCount 1918 public int getCount ( )
    Returns the size of the pool.

---

Class Tree Deprecated Index Help
PREV CLASS  NEXT CLASS                         FRAMES  NO FRAMES
SUMMARY INNER I FIELD I CONSTR I METHOD     DETAIL FIELD I CONSTR I METHOD

FIG. 19B

Class Tree Deprecated Index Help
PREV CLASS  NEXT CLASS                      FRAMES  NO FRAMES
SUMMARY INNER | FIELD | CONSTR | METHOD     DETAIL FIELD | CONSTR | METHOD

Interface SubChannel     2002 public interface SubChannel

Transport mechanism used by data services to send data. It is also use by receiving devices to read data sent by a data service.

| Method Summary | |
|---|---|
| int[ ] | destory ( )  2004<br>perform any cleanup work required to destroy the channel |
| java.io.InputStream | getInputStream ( )  2006<br>Gets the output Stream used to read data from the channel |
| java.io.OutputStream | getOutputStream ( )  2008<br>Gets the output Stream used to send data to the channel |
| int | getQosLevel ( )  2010<br>Gets the Quality of Service level of the channel |

| Method Detail |
|---| getOutputStream   2012 public java.io.OutputStream getOutputStream ( )
            throws java.io.IOException
    Gets the output Stream used to send data to the channel
    Throws:
        java.io.IOException - if the OutputStream cannot be returned getInputStream   2014 public java.io.InputStream getInputStream ( )
            throws java.io.IOException
    Gets the output Stream used to read data from the channel

*FIG. 20A*

Throws:
    java.io.IOException - if the OutputStream cannot be returned

--- getQosLevel    2016 public int getQosLevel ( )

Gets the Quality of Servicelevel of the channel

--- destroy    2018 public int ( ) destroy ( )
    perform any cleanup work required to destroy the channel
    Returns:
        an array integers that determine the sub-carriers that compose this channel.

---

| Class Tree Deprecated Index Help | |
|---|---|
| PREV CLASS NEXT CLASS | FRAMES NO FRAMES |
| SUMMARY INNER I FIELD I CONSTR I METHOD | DETAIL FIELD I CONSTR I METHOD |

FIG. 20B

| Class | Tree Deprecated Index Help |
PREV CLASS NEXT CLASS                               FRAMES NO FRAMES
SUMMARY INNER I FIELD I CONSTR I METHOD             DETAIL FIELD I CONSTR I METHOD

Interface SubChannelFactory 2102 public interface SubChannelFactory

Factory class for creating new subChannels

| Method Summary | |
|---|---|
| SubChannelFactory | newSubChannel (SubCarrier [ ] subcars) 2104<br>method for creating a new subchannel |

| Method Detail | newSubChannel public SubChannel newSubChannel (SubCarrier [ ] subcars)   2106
                    throws java.lang.Exception method for creating a new subchannel
    Parameters:
        subcars - an array of Subcarriers used to compose the new sub channel
    Throws:
        java.lang.Exception - if the Subchannel cannot be created

| Class | Tree Deprecated Index Help |
PREV CLASS NEXT CLASS                               FRAMES NO FRAMES
SUMMARY INNER I FIELD I CONSTR I METHOD             DETAIL FIELD I CONSTR I METHOD

*FIG. 21*

Class Tree Deprecated Index Help
PREV CLASS  NEXT CLASS                               FRAMES  NO FRAMES
SUMMARY INNER | FIELD | CONSTR | METHOD              DETAIL FIELD | CONSTR | METHOD

Interface Service 2202 public interface Service

| Method Summary | | |
|---|---|---|
| | Method Summary | |
| void | Authenticate (DeviceKey dKey) 2204 | |
| java.io.InputStream | getInputStream ( ) 2206 | |
| java.io.OutputStream | getOutputStream ( ) 2208 | |
| ServiceMetaData | getServiceMetaData ( ) 2210 | |
| void | getServiceMetaData ( ) 2212 | |

| Method Detail |
|---| getServiceMetaData 2214 public ServiceMetaData getServiceMetaData ( )

getServiceMetaData 2216 public void getServiceMetaData ( )

getOutputStream 2218 public java.io.OutputStream getOutputStream ( )
                throws java.io.IOException
    Gets the output Stream used to read data from the channel

*FIG. 22A* getInputStream    2220 public java.io.InputStream getInputStream ( )
　　　　　　　　　　　　throws java.io.IOException

---

Authenticate    2222 public void Authenticate (DeviceKey dKey)
　　　　　　　　　　throws java.lang.Exception

---

Class Tree Deprecated Index Help
PREV CLASS  NEXT CLASS                              FRAMES  NO FRAMES
SUMMARY INNER I FIELD I CONSTR I METHOD         DETAIL FIELD I CONSTR I METHOD

*FIG. 22B*

| Class | Tree Deprecated Index Help |
PREV CLASS  NEXT CLASS                           FRAMES  NO FRAMES
SUMMARY INNER I FIELD I CONSTR I METHOD           DETAIL FIELD I CONSTR I METHOD

Interface ServiceListener 2302 public interface ServiceListener

Implementations of this interface are responsible for delegating the construction of subchannel objects and handing them off to the appropriate handler objects. This requires access to both the SubcarrierPool and the SubchannelFactory.

| Method Summary | |
|---|---|
| Service [ ] | getServices ( )   2304<br>returns an array of the services that are actively being received |

| Method Detail |
|---| getServices 2306 public Service[ ] getServices ( )

returns an array of the services that are actively being received

| Class | Tree Deprecated Index Help |
PREV CLASS  NEXT CLASS                           FRAMES  NO FRAMES
SUMMARY INNER I FIELD I CONSTR I METHOD           DETAIL FIELD I CONSTR I METHOD

*FIG. 23*

| Class | Tree Deprecated Index Help | |
|---|---|---|
| PREV CLASS NEXT CLASS | | FRAMES NO FRAMES |
| SUMMARY INNER I FIELD I CONSTR I METHOD | | DETAIL FIELD I CONSTR I METHOD |

Interface ServiceMetaData     2402 public interface ServiceMetaData

| Method Summary | |
|---:|---|
| int | getCategory (int level) 2404 |
| int | getContentRating ( ) 2406 |
| int | getDataSize ( ) 2408 |
| int | getDataSizeMagnitude ( ) 2410 |
| byte[ ] | getDomainID ( ) 2412 |
| int | getEventIndicator ( ) 2414 |
| int | getGroupID ( ) 2416 |
| int | getMimeType ( ) 2418 |
| long | getReceiverTimeStamp ( ) 2420 |
| int | getReservedBits ( ) 2422 |
| long | getSenderTimeStamp ( ) 2424 |
| int | getStatusBits ( ) 2426 |
| int | getSyncCue ( ) 2428 |
| void | setReceiverTimeStamp (long tStamp) 2430 |

*FIG. 24A*

| Method Detail |
|---| getSyncCue public int getSyncCue ( )

--- getSenderTimeStamp public long getSenderTimeStamp ( )

--- setReceiverTimeStamp public void setReceiverTimeStamp (long tStamp)

--- getReceiverTimeStamp public long getReceiverTimeStamp ( )

--- getDomainID public byte [ ] getDomainID ( )

--- getContentRating public int getContentRating ( )

--- getCategory public int getCategory (int level)

--- getDataSize public int getDataSize ( )

*FIG. 24B* getDataSizeMagnitude public int getDataSizeMagnitude ( )

getReservedBits public int getReservedBits ( )

getStatusBits public int getStatusBits ( )

getEventIndicator public int getEventIndicator (int level)

getGroupID public int getGroupID ( )

getMimeType public int getMimeType ( )

---

| Class | Tree  Deprecated  Index  Help |
|---|---|
| PREV CLASS  NEXT CLASS | FRAMES  NO FRAMES |
| SUMMARY INNER I FIELD I CONSTR I METHOD | DETAIL FIELD I CONSTR I METHOD |

*FIG. 24C*

SYSTEM AND METHOD FOR TRANSMITTING DIGITAL MULTIMEDIA DATA WITH ANALOG BROADCAST DATA

CROSS-REFERENCE TO RELATED APPLICATIONS

This application claims priority under 35 U.S.C. §119 to U.S. Provisional Patent Application Ser. No. 60/306,080 entitled "EXTERNAL NETWORK INTERFACE" filed in the name of Paul Signorelli on Jul. 17, 2001; and further is a continuation-in-part of U.S. patent application Ser. No. 09/839,451 entitled "SYSTEM AND METHOD FOR GENERATING MULTIMEDIA ACCOMPANIMENTS TO BROADCAST DATA" filed in the name of David Corts et al. on Apr. 20, 2001 now U.S. Pat. No. 7,908,172, which is a continuation-in-part of U.S. patent application Ser. No. 09/802,469 filed on Mar. 9, 2001 now abandoned which, in turn, claims priority to U.S. Provisional Patent Application Ser. No. 60/188,050 filed on Mar. 9, 2000; this application is further related to U.S. Patent Application Ser. No. 60/346,785 entitled "SYSTEM AND METHOD FOR ASSEMBLING SUPPLEMENTAL DIGITAL DATA TO BE BROADCAST ON AN SIDEBAND OF AN ANALOG BROADCAST" filed in the name of David Corts et al. on Jan. 7, 2002; and U.S. Patent Application Ser. No. 60/346,784 entitled "SYSTEM AND APPARATUS FOR TRANSMITTING DIGITAL MULTIMEDIA DATA WITH ANALOG BROADCAST DATA" filed in the name of David Corts et al. on Jan. 7, 2002, the entirety of each of these applications being incorporated herein by reference.

FIELD OF THE INVENTION

The present invention is directed generally to multiplex communications, and more particularly to communicating messages over free space (i.e. a radio frequency (RF) sideband/sub-carrier or frequency mask) for reception at multiple destinations.

BACKGROUND OF THE INVENTION

In-Band On-Channel (IBOC) broadcasting is an emerging Digital Audio Broadcasting (DAB) technology, developed by IBIQUITY DIGITAL, INC., that enables existing radio broadcasters to transmit digital data over current analog transmission frequencies. Such radio broadcasters commonly employ amplitude-modulated (AM) and frequency-modulated (FM) bands for the transmission of audio broadcast data. IBOC technology has the ability to create a "hybrid" signal that can simultaneously send both the analog and digital data. U.S. Pat. No. 5,757,854, incorporated in its entirety herein by reference, discusses these capabilities in greater detail.

Digital data may be digitally-formatted data or digitally compressed analog data. Digital data may include processing instructions for rendering visual and/or audio components on, for example, an IBOC receiver. Such processing instructions may be used to render synchronized visual components, such as text and images describing artist or song title information for currently-broadcast songs on the analog band, news headlines, traffic reports or other information that would be of interest to a radio listener. The digital data may include audio components for presenting selectable audio data.

In an IBOC network, IBOC receivers recognize analog and digital data broadcast by IBOC transmitters, and present such data to a user through a display and/or an audio output. The user may interact with the data and provide a response via the IBOC receiver to either a party operating the IBOC transmitter or a third party. Additional examples of digital data and its uses are described in co-pending U.S. patent application Ser. No. 09/839,451, assigned to the assignee of the present invention.

In order to accommodate these various IBOC network functionalities, a protocol for the assembly, transmission and synchronization of such digital data is described.

SUMMARY OF THE INVENTION

The present invention relates to the data formats used to transmit digital data over traditional analog bands and other features enabled by IBOC technology.

One aspect of the present invention relates to the transmission of digital data, such as digital audio data, over predefined channels, such as AM or FM channels using known radio broadcast equipment.

Another aspect of the present invention relates to the successful transmission of digital data over analog bands using various synchronization protocols between the sender and the receiver.

Still another aspect of the present invention relates to providing sufficient security for the digital transmission so to prevent the tampering or corruption of data by an outside source. The security process involves various encryption protocols and authentication procedures.

Yet another aspect of the present invention relates to the transmission of a response from an IBOC receiver to an appropriate operation handler. Such operation handler may be a native handler, wherein an embedded module or procedure exists to service the request. In another embodiment the appropriate operation handler may be a non-native handler, wherein the service request is transmitted to another device for handling.

Still another aspect of the present invention relates to the creation of a Quality-of-Service (QOS) system, wherein a group of RF carrier bands is created around each central frequency available for broadcast. Since the reliability of data transmission decreases with RF carriers further from the central frequency, these RF carriers may be grouped according to the volume of data that can be successfully accommodated within a predetermined time. For example, digital data corresponding to a real-time sporting event (which may require continuous updates of digital data) may be transmitted over a more-reliable, high-volume RF carrier or set of RF carriers, while digital data corresponding to a weather report that is updated only every hour may be repeatedly transmitted over a less-reliable, low-volume or set of RF carriers to insure reception of all required digital data.

BRIEF DESCRIPTION OF THE DRAWINGS

Further aspects of the instant invention will be more readily appreciated upon review of the detailed description of the preferred embodiments included below when taken in conjunction with the accompanying drawings, of which:

FIG. 4 is a block diagram of an exemplary organization data for the format of FIG. 3;

FIG. 12 is a block diagram depicting an exemplary data structure for an authentication header;

FIG. 16 is a depiction of an exemplary JAVASCRIPT module for the Quality-of-Service manager;

FIG. 17A-B are depictions of an exemplary RF carrier javascript module;

FIG. 18 is a depiction of an exemplary RF carrier Factory javascript module;

FIG. 19A-B are depictions of an exemplary RF carrier Pool javascript module;

FIG. 20A-B are depictions of an exemplary Sub-channel javascript module;

FIG. 21 is a depictions of an exemplary Sub-channelFactory javascript module;

FIG. 22A-B are depictions of an exemplary Service javascript module;

FIG. 23 is a description of the ServiceListenerjavascript module;

FIG. 24A-C are descriptions of the ServiceMetaDatajavascript module;

DETAILED DESCRIPTIONS OF THE INVENTION

Broadcast Data

Figure 1:
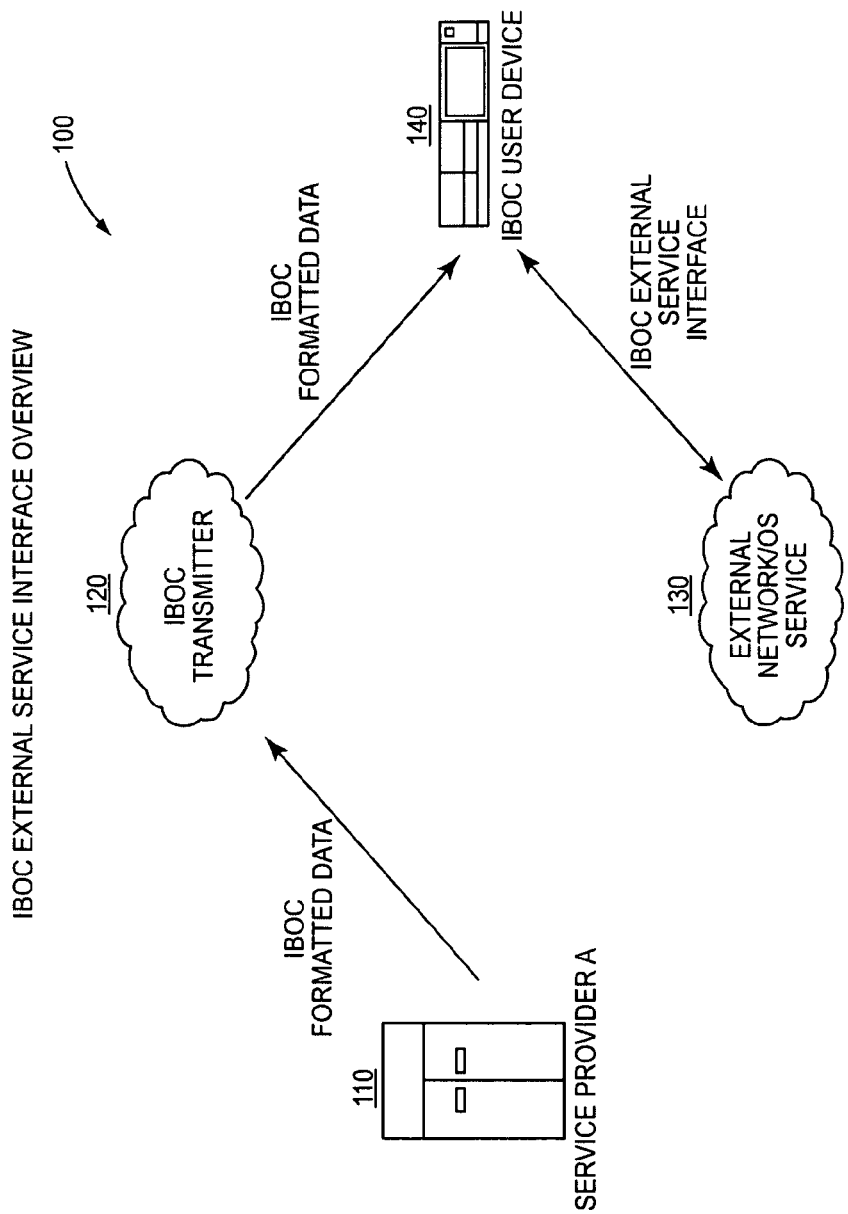
FIG. 1 is an of an exemplary IBOC network including transmitters, receivers and third party service providers.

In one non-limiting example embodiment of broadcast data, a given radio frequency may carry the following information: a streamed analog broadcast, and an analog sub-carrier data, and/or the like.

Sub-carrier data is generally small text or numeric information. The sub-carrier data is carried on a standardized set of rf frequencies using any number of standard transmission technologies.

An RF carrier is a single carrier frequency on an AM or FM radio channel capable of carrying n-bits of data For example, one RF carrier may carry 4 bits or 8 bits of data. RF carriers have varying degrees of robustness. The robustness of an RF carrier can relate to one or more factors including distortion from adjacent radio frequencies and distortion from the analog carrier on the same channel. To overcome this, on RF carriers with lower robustness, data can be given a greater emphasis on error correction. This can include looping (re-transmitting) data, using forward error correction techniques, and interleaving the data. Applying more error correction data has the effect of reducing the bandwidth. The robustness of a given RF carrier for a particular broadcast facility can be reasonably estimated and predicted. Consequently, over a given period of time, the bandwidth contribution of a single RF carrier or a series of RF carriers for a broadcast facility can be calculated.

With the advent of IBOC a given radio frequency will continue to carry a streamed analog broadcast, but also has the ability to have one or more streamed digital audio broadcasts as well. At least one of the digital audio broadcasts is intended to be a digital duplication of the analog audio broadcast. On top of that, the IBOC system allows for the transmission of binary and ASCII files, and the streaming of text and numeric information with the digital audio. Analog sub-carriers can co-exist with the new digital IBOC information on the RF carriers as well. Thus, at any given time a radio broadcaster could have a single streamed analog audio broadcast, one or more streamed digital audio broadcasts, a series of text and numeric information streamed with digital audio, any number of binary and ASCII files, sub-carrier data, and/or the like. Any of these can be considered broadcast data.

Furthermore, the streamed text and numeric information can carry instructions and data to be rendered to the receiver. The binary and ASCII files can be multimedia data such as textual file formats (e.g., ASCII plain text, rich text, html, xml, and/or the like), audio file formats, graphic file formats, video file formats (e.g. MPEGs, MP3s, JPGs, GIFs, and/or the like), multimedia file formats, and/or the like. These files can also be mark-up or instructions to an application on the receiver.

Trigger Event

In one non-limiting example embodiment, a trigger event is an event that occurs on the receiver that causes an action to occur. The action that occurs can be any action available to the receiver. Examples of receiver actions are displaying data, playing an audio file, recording the main program audio stream, pulling data from the storage, and/or the like. If the receiver also has a two-way communication channel associated with it, then the action could initiate communication on this second channel. In one implementation, there are three types of trigger events: a broadcast event, a system event, and a user event A broadcast trigger event occurs via the broadcast itself. A broadcast trigger event associates a receiver action with some element of broadcast data. For example, it could be an event associated with the audio stream (analog or digital) that can be used to synchronize program audio and data. It could be an event associated with a particular time kept by the broadcaster. This could be used to tell the receiver and/or user that it is the start of the 7 A.M. broadcast hour or that it is 7 A.M. according to the National Institute of Standards and Technology.

A system event occurs when a receiver condition is met. System events can be the time kept by the receiver, the location of the receiver, and a signal receiver from a separate communication channel. For example, a system event can occur when a receiver in a car with a navigation system receives a notification from the navigation system as to the location of the vehicle. In such an example, the receiver can request a regional ad query so that regional advertising would be scheduled with broadcast data.

A user event is initiated through the receiver by the user. A user event could be the pressing of a button on the receiver or even a voice command issued by the driver.

Trigger events operate similarly. When they occur, they engaged associated actions.

FIG. 1 provides an overview of an exemplary IBOC communication network 100. A service provider 110 sends formatted digital data suitable for transmission to IBOC transmitter 120. The IBOC-formatted data may also be transmitted over other types of networks, such as a co-axial network or a fiber optic network. The IBOC transmitter 120 may then transmit the digital data, as well as analog audio data, over a wireless network to a plurality of IBOC user devices 140. The IBOC user device 140 may be an analog/digital radio receiver. The IBOC user device 140 may be configured to receive IBOC formatted data in addition to other data formats, such as wireless access protocol (WAP) formats. As seen in FIG. 1, the IBOC user device 140 may possess an external service interface, which allows it to receive data from a third party external network service 130, that may or may not be configured to transmit IBOC formatted data.

Figure 2:
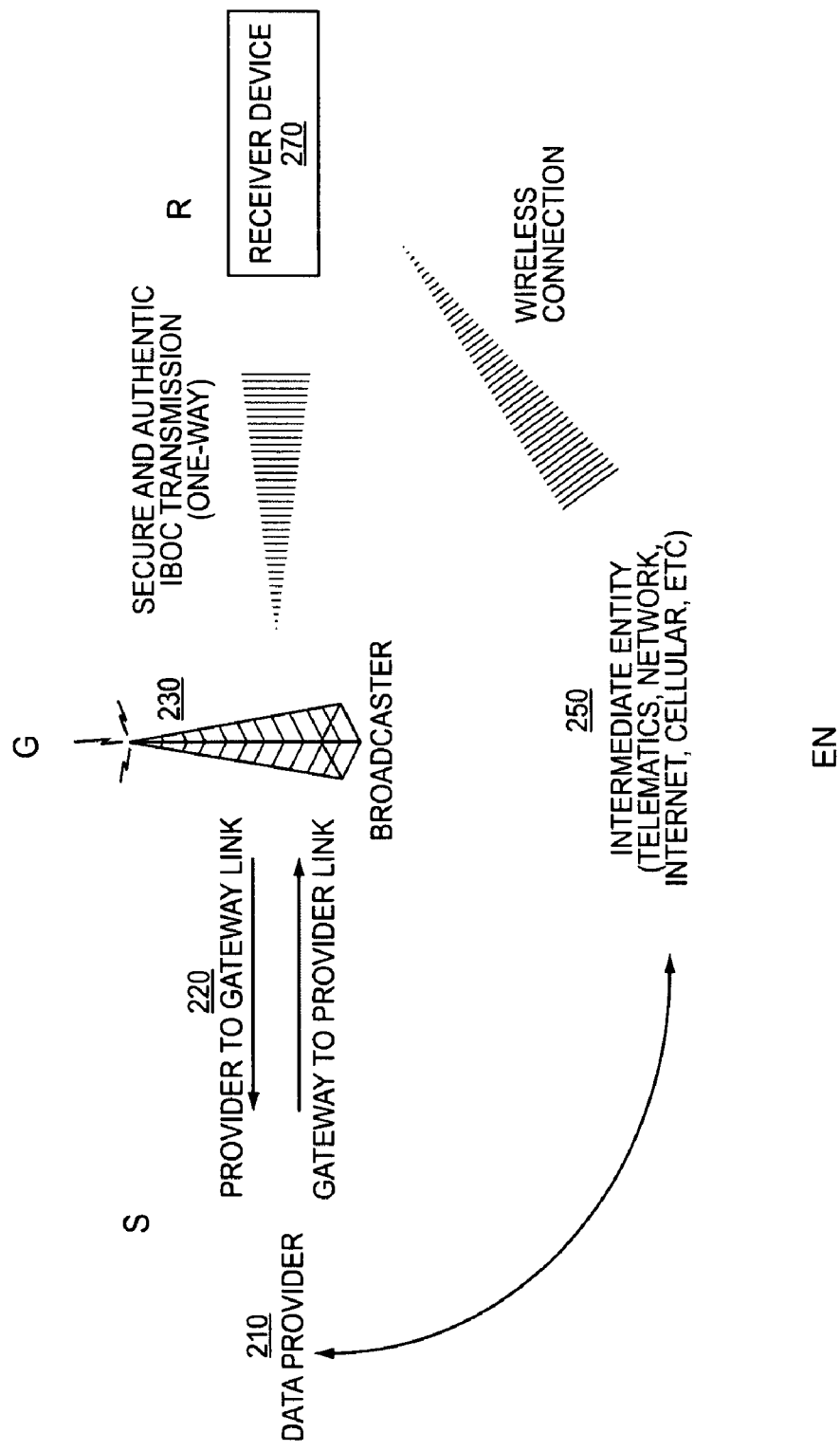
FIG. 2 is a diagram depicting an exemplary flow of information between the devices shown in FIG. 1.

FIG. 2 is a diagram of the operation of the IBOC system in one embodiment. The data provider 210 is analogous to the service provider 110 of FIG. 1, which assembles and distributes the digital data for IBOC transmission. The digital data is then sent over a dedicated gateway link 220 to a broadcaster 230. The gateway link 220 may be a wireless link, such as a cellular link, or a may be a non-wireless connection such as a fiber optic link. In the IBOC scheme, the broadcaster 230 may be an existing radio broadcaster. By using existing broadcasters, new hardware for accomplishing radio transmission need not be introduced during the implementation of the IBOC system. The IBOC formatted digital data is then transmitted wirelessly to the receiver device 270 using traditional frequencies in the AM or FM band.

Besides transmitting through radio frequencies over existing networks, IBOC formatted data may also be transmitted over an intermediate entity 250. The intermediate entity 250 may be a telematics network, the internet, a cellular network, or a number of other data networks. Data going through this intermediate network 250 is transmitted wirelessly to the IBOC user device 270.

Figure 3:
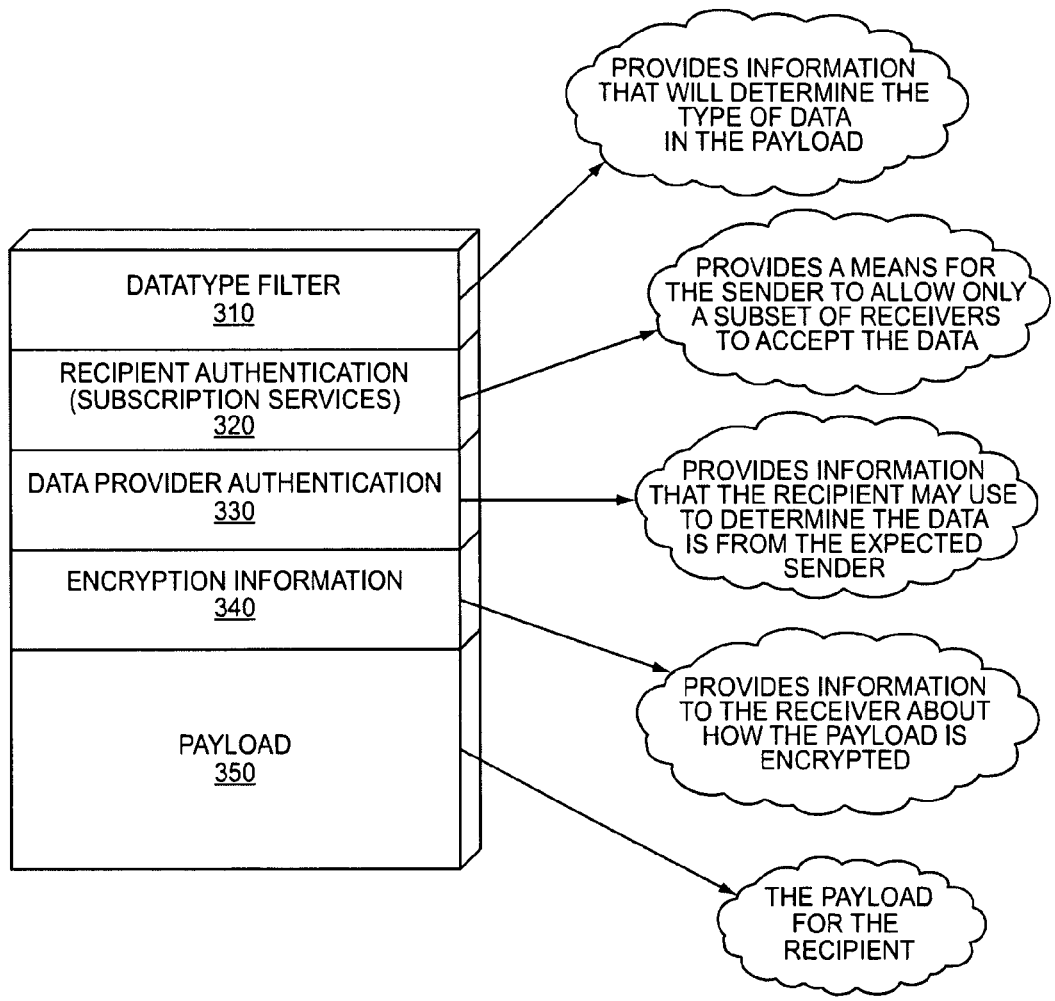
FIG. 3 is a block diagram of an exemplary data format used in the transmission of digital data over the IBOC network of FIG. 1.

FIG. 3 is an example of the organization of digital data into a format for IBOC transmission. Elements 310-340 represent block headers that are transmitted prior to the payload digital data 350, such as digital audio data to be rendered for a user of the user device 140. The first part of the block header is datatype filter 310, which provides information on the type of data in the payload, such as audio data, visual or textual data, such as song title or artist name, or any number of other digital communication that can occur during the operation of the system.

Filter Masks

To better understand the channel headers, it is useful to understand the power and flexibility of filter masks. A filter mask is information that may be embodied in a "tag" that is assigned to data from a data service. This tagged filter mask may be used by a receiving device to either accept or reject various forms of data. In one non-limiting example embodiment, the ability and manner in which the filter mask is employed, i.e., its capability, depends on the abilities of a particular radio receiver. The filter mask can be and/or mask any kind of data For example, certain devices have limited capabilities, which would benefit from filter masks that filter out data types that are not understood by the device. As such, an example IBOC capable radio that had no video and/or text display abilities might have a filter mask that enabled it to ignore any video and/or text display information. One of the numerous advantages to such a filter mask is that the limited example device could simply ignore information that is tagged for video and/or text and not expend resources to interpret and/or process such data. Such a filter mask can also be used to manage subscription based information; i.e., subscribing customers would be allowed to view certain data while non-subscribers would not. Thus in one non-limiting example embodiment, a device would maintain tags representing its various abilities and/or subscriptions as a series of tags, which would act as a filter mask, i.e., filtering information. In such an example, broadcast data would include data in tagged format so that it may be discerned and acted upon appropriately. As such, when a device receives such tagged broadcast data, the device will compare the received tagged data to its own abilities as represented by its maintained tags. Received tagged data that matches the devices maintained ability tags will be processed appropriately by the device. In one example, XML based tagging structure may be employed for such filtering and/or tagging. For example, tagged data may be of the form:

```
<?xml version="1.0" standalone="yes"?>
<formats>
    <textual>
<textual_data>Song Lyrics</textual_data>
<title>A Song Title</title>
<author>John Doe</author>
<publisher>Acme, Inc.</publisher>
<pub_year>1999</pub_year>
<subscription_information>FALSE</subscription_information>
    </textual>
    <audio>
<digital_data>DATA</digital_data>
<title>A Song Title</title>
<author>John Doe</author>
<publisher>Acme, Inc.</publisher>
<pub_year>1999</pub_year>
<subscription_information>TRUE</subscription_information>
    </audio>
    <video>
<digital_data>DATA</digital_data>
    <title>A Song Title</title>
    <author>John Doe</author>
    <publisher>Acme, Inc.</publisher>
    <pub_year>1999</pub_year>
    <codec>MPEG4</codec>
        </video>
</formats>
```

An example device might have the following have its capabilities defined as such:

```
<?xml version="1.0" standalone="yes"?>
<formats>
    <textual>
     <capability>FALSE</capability>
    </textual>
        <audio>
    <capablity>TRUE</capability>
    <subscription_information>TRUE</subscription_information>
        </audio>
        <video>
    <capability>FALSE</capability>
        </video>
    </formats>
```

In such an example, as the only matching tag format types are "audio," only the audio "DATA" will be processed on the receiving device. In an alternative embodiment, a device may examine its own "capability" tags and process data based on its abilities. In such an embodiment, if the device receives data tagged with one of its know capabilities, such data will be processed. The capabilities may further define a specific kind of software requisite to process the data; i.e., a "codec" tag may be provided so that the receiving device must contain and/or obtain the requisite and/or specified codec (e.g., "MPEG4") for processing received data. In another alternative embodiment, a device may filter information with a subscription tag. In such an embodiment, if the broadcast data is tagged with a, for example, "subscription information" being "TRUE" (and/or set to a password and/or some other security information, e.g., encryption key, etc.) and the receiving device had its subscription tag enabled with a matching "TRUE" and/or password, then the received data will be processed. Thus, with the above example, audio information tagged requiring a subscription would only be played on devices capable of producing audio and possessing an enabled subscription tag; i.e., a subscription tag on the device set to "TRUE" and/or the requisite password.

Such filtering allows a point-to-multipoint broadcasting medium to provide better targeting of information to receiving devices.

In an alternative filter mask embodiment, an application is defined. For example, an application in the IBOC world would be "program associated data" or "TAD." A code is assigned to a PAD. In this way, anytime an application is transmitted, the PAD code acts as the filter. Any receiver designed to interpret PAD and/or associated codes would know to look for that code and employ it as a filter.

Figure 29:
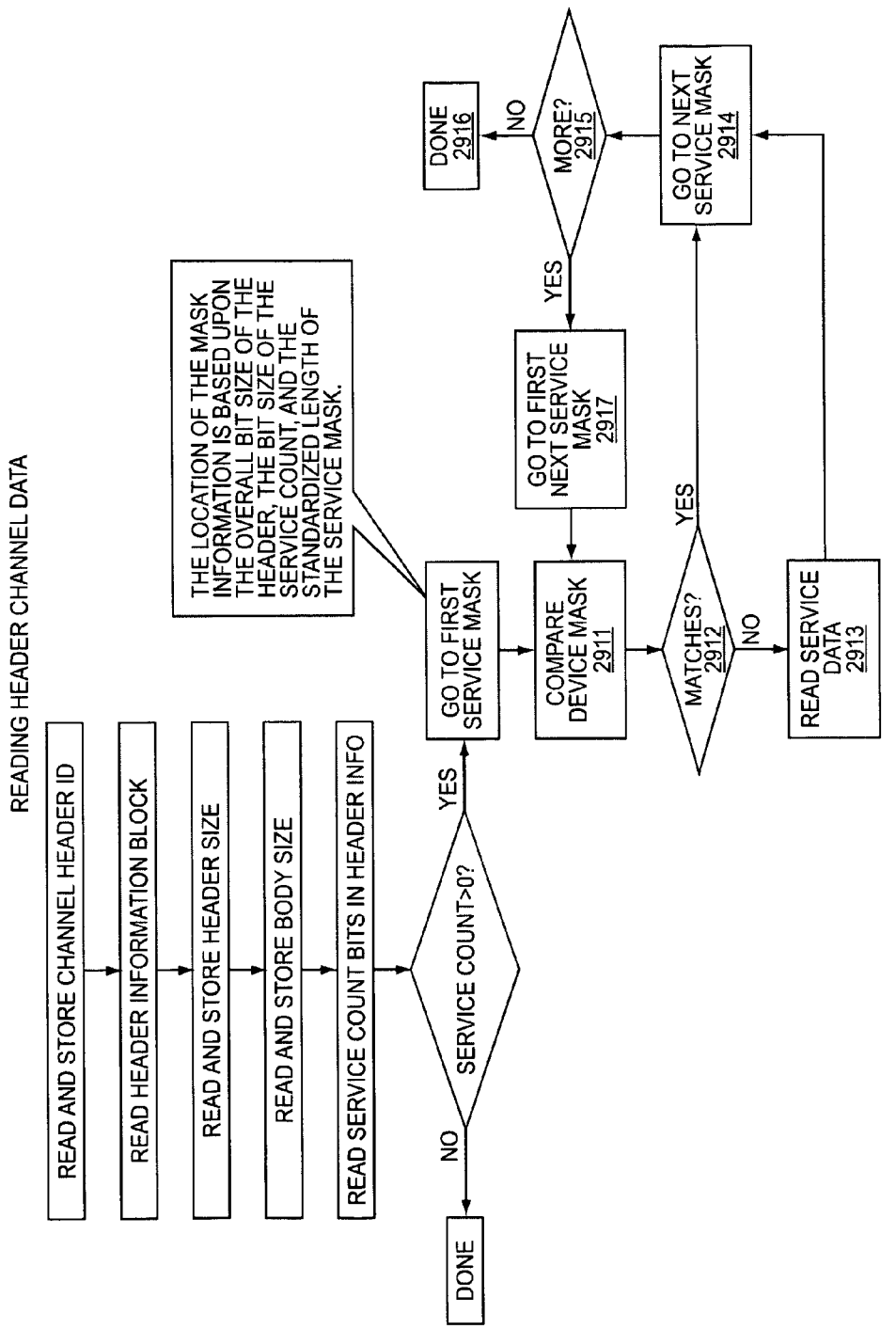
FIG. 29 is an illustration depicting an exemplary processing of filter masks.

FIGS. 27 through 32 illustrate one non-limiting example embodiment of filter masks. A service mask is provided for each service, and as such may occupy a variable number of bits in a channel header body 2702 of FIG. 27. Quality of service filtering-may add to the filter mask, providing another dimension of filtering 2802 of FIG. 28. Further, FIG. 29 illustrates that filter masks are processed as part of reading header channel data. The received filter mask is compared to the device filter 2911. If there is no match between the received filter mask and the device filter mask 2912, then the data service is read 2913. If there is a match 2912 or if the data service is read 2913, then iteration continues to the next service mask 2914. If there are no more service masks 2915, then there is no more header channel data to read 2916. If there are more service masks 2915, then header channel data iteration continues by going to the next service mask 2917 and again comparing the service mask with a device mask 2911.

Figure 30:
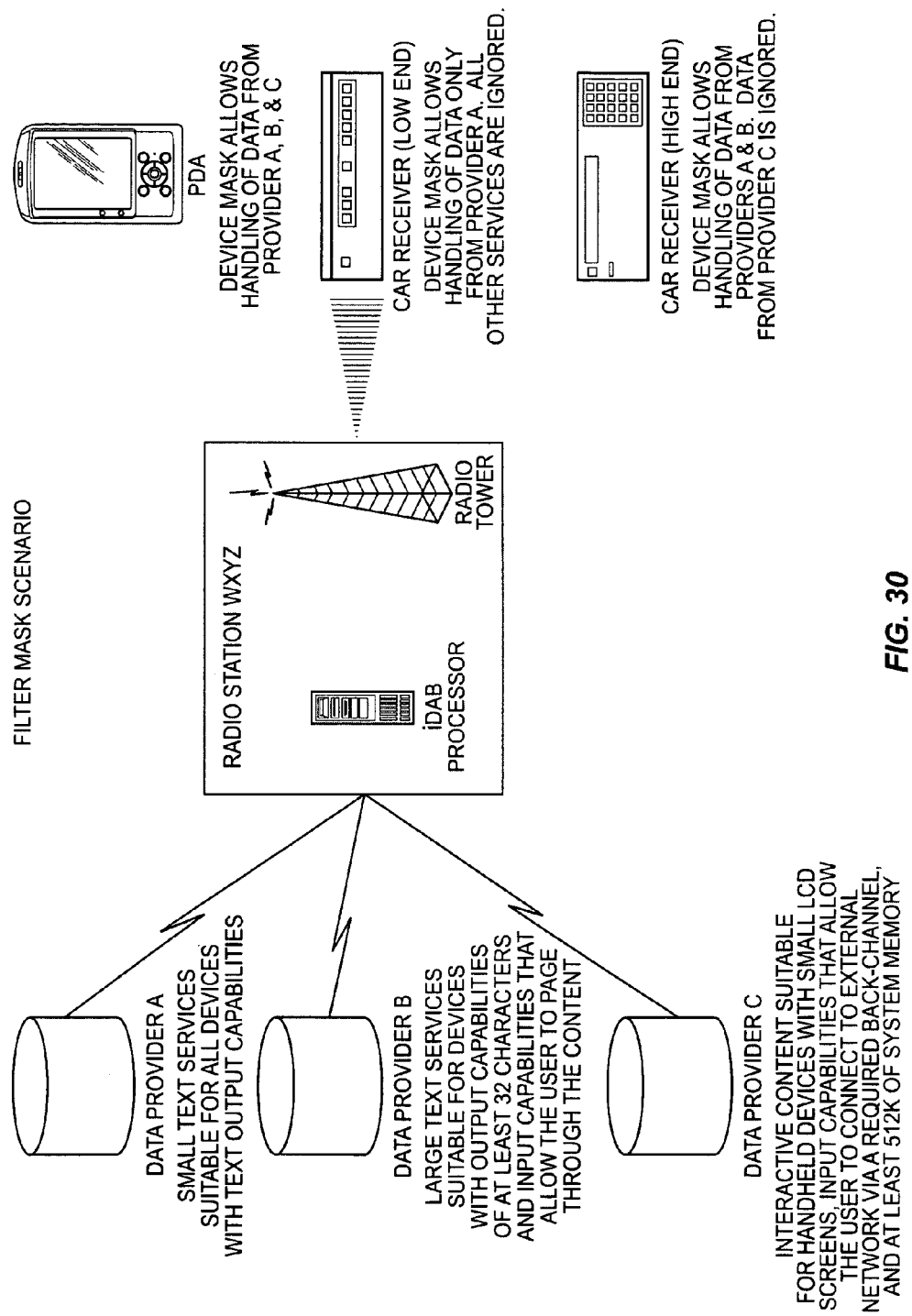
FIG. 30 further illustrates one non-limiting example of the practical effects of employing service masks.

FIG. 30 further illustrates one non-limiting example of the practical effects of employing service masks. Various data providers A, B, and C supply their content (small text services, large text services and interactive data services, respectively) to a (iDAB) server for preparation for broadcast at a radio station WXYZ. After a program signal is transmitted, which now includes content from content providers A, B, and C along with regular broadcast materials, various devices obtain the signal and use the broadcast filter mask to enable the displaying of content matching the device mask in a receiving device. In one non-limiting example embodiment, a device mask may be supplied as a software upgrade to a device. Examples in FIG. 30 show that a PDA might be capable of displaying content from data providers A, B, and C because a PDA has an improved display and input capabilities allowing for long textual and graphic display as well as interaction; while a low-end car receiver is capable of only displaying content from data provider A as it may only have a limited alphanumeric display capable of showing short messages; and a high-end car receiver is able to display content from both data providers A and B because it has an enhanced screen display allowing it to display long messages and graphics.

Figure 31:
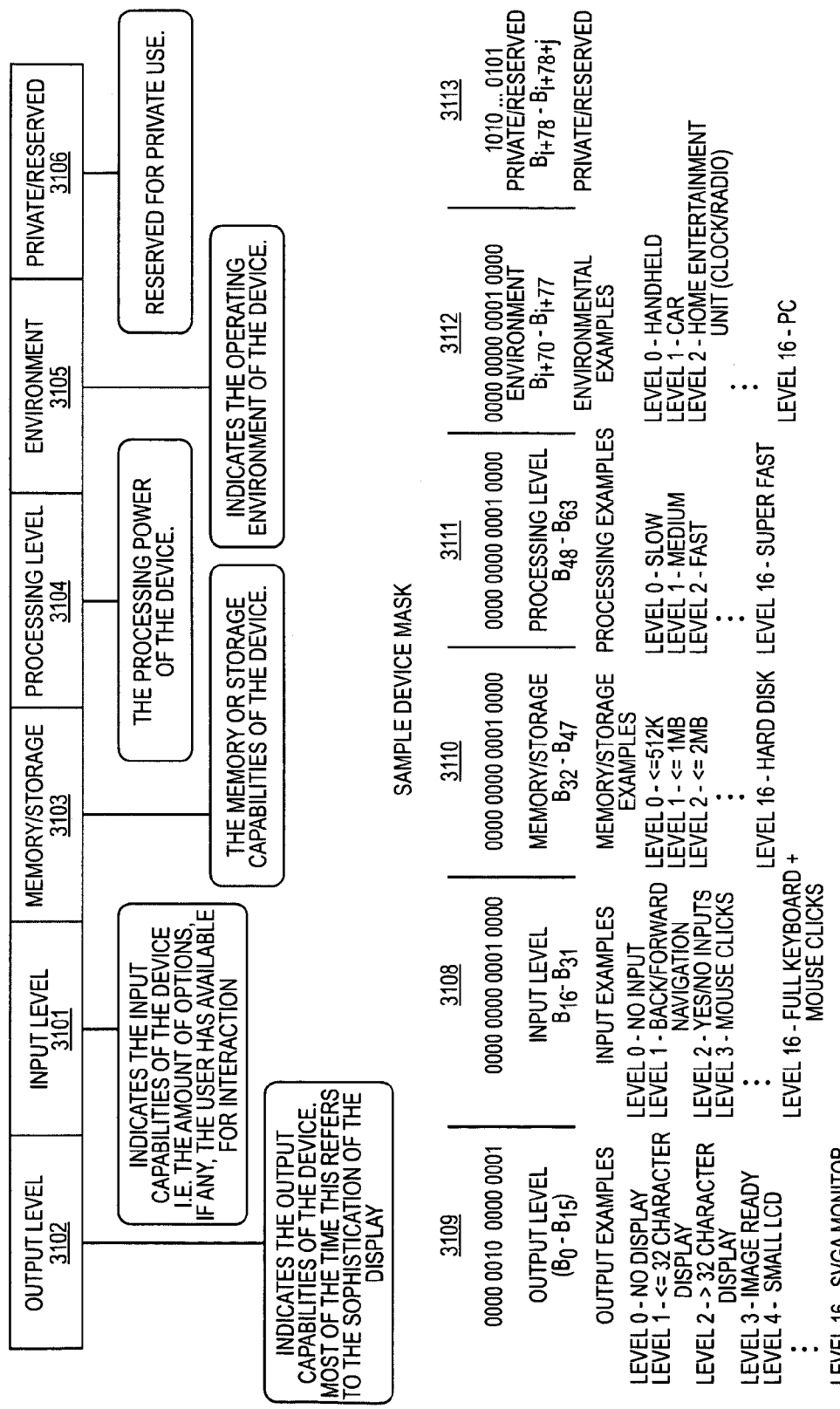
FIG. 31 illustrates another non-limiting example embodiment of a device mask.

FIG. 31 illustrates another non-limiting example embodiment of a device mask. As is shown, input capabilities 3101, output capabilities 3102, memory capabilities 3103, processing level 3104, device type environment 3105, and various reserved 3106 parameters may define a device mask 3107. In one non-limiting example embodiment, the input capabilities 3108 indicate the types of interaction options available to a user (e.g., level 0 having no interaction abilities, level 1 having the abilities to navigate back and forth in received data, etc.). Similarly, the output capabilities 3109 indicate the types of output options are available data (e.g., level 0 having no display, level 1 having less than 33 characters for display, etc.). The memory capabilities 3110 indicate the amount of memory the device has for storing data (e.g., level 0 having 512 Kb or less, level 1 having 1 Mb or less, etc.). The processing level 3111 indicates the amount of computational resources that are available to the device (e.g., level 0 being a slow device, level 1 a medium speed processing device, etc.). The device type environment segment 3112 of the device mask may indicate the general environment in which the device operates (e.g., a level 0 device being handheld, a level 1 device being used in a car environment, etc.) As is illustrated, many device and performance characteristics may be accounted for by making additional components and/or tags that comprise the device mask. As such, a component of the device mask may be reserved for other purposes 3113, thus expanding upon and providing for future operational flexibility.

Figure 32:
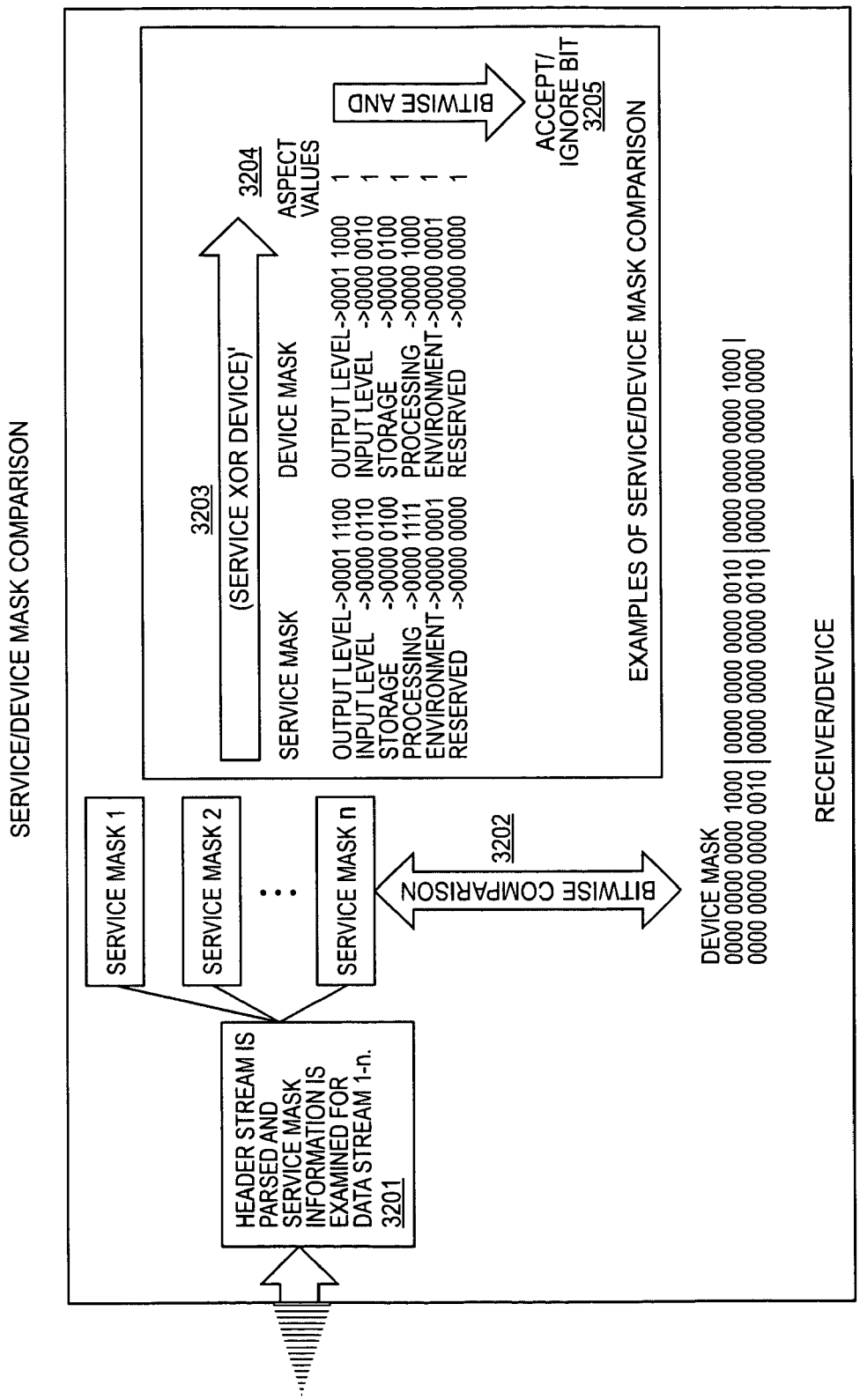
FIG. 32 illustrates one non-limiting example of the comparison of service and device masks.

FIG. 32 illustrates one non-limiting example of the comparison of service and device masks. A header stream is extracted from a broadcast and parsed 3201. Upon parsing out the various service masks, the receiving device may engage in a bitwise comparison between the parsed service masks and the device mask within 3202. By employing a bitwise exclusive-or (XOR) function on both the service mask and the device mask 3203, aspect values 3204 are obtained and may be used to accept or ignore 3205 data associated with a given service mask. Of course, numerous forms of service and device masks may be used (e.g., the XML tag form as already discussed), and various types of comparisons may be employed as well.

Channel Header Structure

Moving back to FIG. 3, the second part of the block header is the recipient authentication 320, which provides a means for the sender to allow only a subset of receivers to accept the data For example, the data may be part of a subscription-only service. Using the recipient authentication 320, the data sender may format the digital data so that only subscriber receivers will be able to receive and render it. The authentication process may also employ a number of protocols such as one-way authentication, where only the sender transmits an authentication message; two-way authentication, where the sender transmits an authentication message and the receiver transmits a reply authentication message; or three-way authentication, where the sender transmits an authentication message and the receiver transmits a reply authentication message and the sender further transmits a reply to the receiver's reply authentication message.

The third part of the block header is the data provider authentication 330, which provides information that the recipient may use to confirm that the data that has been received from an expected broadcaster. The data provider authentication 330 may employ the same one-way, two-way, or three-way authentication process described previously for the recipient authentication 320.

The fourth part of the block header is the encryption information 340, which contain information about the encryption algorithm used to encode the digital data The encryption information may contain a public key or a number of other data for a number of other encryption algorithms.

Finally, payload 350 contains the digital data that is to be transmitted to and rendered by the IBOC user device 140. Payload 350 may contain a plurality of sub-headers that can be used in conjunction with the headers described in FIG. 3.

Sender time stamp 404 is a 32bit word representing the time the data was sent from the broadcaster 230. In this embodiment, the time may be represented in milliseconds. For higher accuracy, the time may be represented in tenths of milliseconds or even nanoseconds, and the size of the sender time stamp may be increased accordingly. The receiver time stamp 406 is a 32 bit word analogous to the sender time stamp 404. It represents the time of the last time the data was rendered/executed by the receiver. Like the sender time stamp 404, the receiver time stamp 406 is expressed in milliseconds, but may be configured to more precision as the size of the time stamp is increased to be more than 32 bits.

A problem present in this system that is not present in the radio systems in the prior art is that the receiver would have to be in synchronization with the transmitter to insure that there is no skipping or other anomalies in audio playback. A series of synchronization events are used to insure proper synchronization, these events are contiguous series of time that are correlated with the audio broadcast. For example, the digital data to be rendered could be a 30-second advertising commercial to be played during the first 50-second interval of a song. A synchronization cue is used to trigger this synchronization event.

The Event ID 424 is used to identify the correct synchronization cues for any particular digital data Finally, User Data 432 is the executable data, such as multimedia data, to be rendered.

Beside these fields in the header body, there are other optional fields that may facilitate data transmission in the present invention. Such fields include synchronization cue field 402 which may be, for example, a sixteen-bit word that may be used to place the data on demand so that the data can be readily rendered at the appropriate time.

Another optional field is a domain identification field 408, which may include a 4 byte long word that, in the application for digital radio, may be used to broadcast the call letters of the particular radio station, thereby identifying the source of the transmission. The call letters may be "WNBC," "WXRQ," "WNEW" or any combination of four alphanumeric characters. These letters may be encoded as digital information using any encoding scheme, such as the American Standard Code for Information Interchange (ASCII) standard.

The next block is content rating field 410, which may be a 4 bit nibble that can be used to designate a rating on the program being broadcast. This feature allows the user to exercise a certain degree of listener discretion to avoid certain objectionable materials. There are 16 different ratings that can be designated on a particular transmission, for example, a "0001" nibble may be encoded as being intended for a general audience, whereas a "1111" nibble may be encoded as being intended for an adults only audience.

After content rating 410, the next block of data is content category field 412. Currently there is a variety of programming available on radio, such as music programming, broadcasting of sporting events, talk shows, interviews, and public addresses. A digital radio receiver has a display means such as a liquid-crystal display (LCD) that can present information about the category of the transmitted programming. That information is encoded within the 5 bytes of the content category field 412. The first byte of the content category 412 may be the most generic (i.e. music) with later bytes of the content category field 412 being more specific (i.e. rock-n-roll). In another example in which a sporting event is being broadcast as analog data, the first byte of the content category field 412 may be encoded to be "00001000" to indicate sports, the most generic category. The second byte may be encoded to be "00000010" to indicate that the sporting event is a Major League Baseball game, a narrower category than the first byte. The third byte may be encoded to be "00000001" to indicate that the home team in the baseball game is the Yankees, a category narrower still. The fourth and fifth byte, in this example, would not be applied. The same structure can be applied to music. When music programming is being transmitted, the first byte of the content category field 412 may be encoded to be "00100010" to indicate music, the most generic category. The second byte may be encoded to be "00010001" to indicate rock music, a narrower category than the first byte. If the music being transmitted is classical music, then the third byte may be encoded to be "00001100" to indicate Baroque music, or other values to indicate Romantic, Medieval, or Modem music, a category narrower than the second byte. The fourth byte may be encoded to be "00110011" to indicate that the music being transmitted is a chamber piece, or other values to indicate an orchestral piece, a violin solo, or any number of other types of performances. Similar categones can be designated to other types of radio programming being transmitted, such as talk shows or public addresses.

File size number field 414 and file size magnitude field 418 are the next optional blocks in the header, following the content category field 412. File size number field 414 may be a 16 bit word that indicates the size of the file being sent, for example, in kilobytes. File size magnitude field 418 may be a 2 bit word that indicates the magnitude of the file size number (i.e. bits, bytes, kilobytes, megabytes). The size of the file may be obtained by examining the file size number field 414 and the file size magnitude field 418. For example, if a file being sent is 5 megabytes in size, the file size number 414 may be encoded as "0000000000000101," the number "5" in the binary system, and file magnitude 419 may be encoded as "11," which may represent megabytes in the current system.

ResenTed bits field 420 are optionally allocated for future use as the digital radio system is dynamically designed so changes can be readily incorporated in the current system.

Status flags field 422 may be used during the operation of the digital radio to set flags for various data used by the user device 140.

Figure 5:
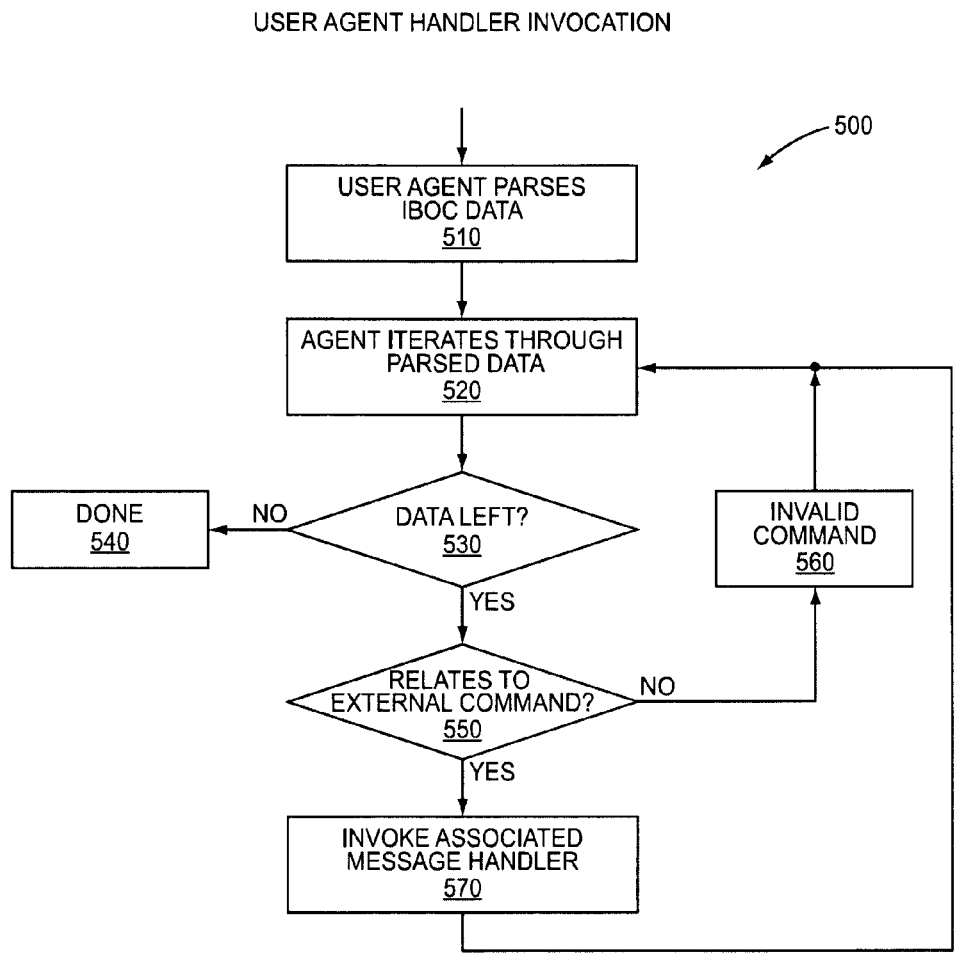
FIG. 5 is a flowchart depicting an exemplary process for invoking a user agent handler to accomplish the reception of digital data.

Group identifier (ID) field 428 can be used to identify stored digital data blocks that can be combined and re-used. This, in turn, decreases the data load to be transmitted by broadcaster 230 by reducing redundant data transmission. FIGS. 5-9 depict the operations of a user agent module employed by the user device 140. FIG. 5 is a flowchart depicting a user agent handler invocation process 500, the first process encountered by the incoming data at the receiver end. The user agent first parses the incoming digital data (step 510). The parsing may be done according to frequency, data type, modulation (such as AM or FM), or any number of other useful parameters. The agent then searches the parsed data (step 520). If the data relates to an external command, (step 550), then the user agent invokes the message handler appropriate for the external command (step 570). If the data relates to none of the external commands, then an invalid command message is produced (step 560). After the determination is made on whether if the data relate to external command and appropriate actions taken at either step 560 or 570, the invocation process returns to step 520 and iterates through the rest of the incoming data. During the iteration process, the user agent checks for the end of the data stream at step 530. An indication for the end of the data stream may be an end-of-file (EOF) flag in status flag field 422. When the end of the data stream is reached, the user agent ends the handler invocation process (step 540).

Figure 6:
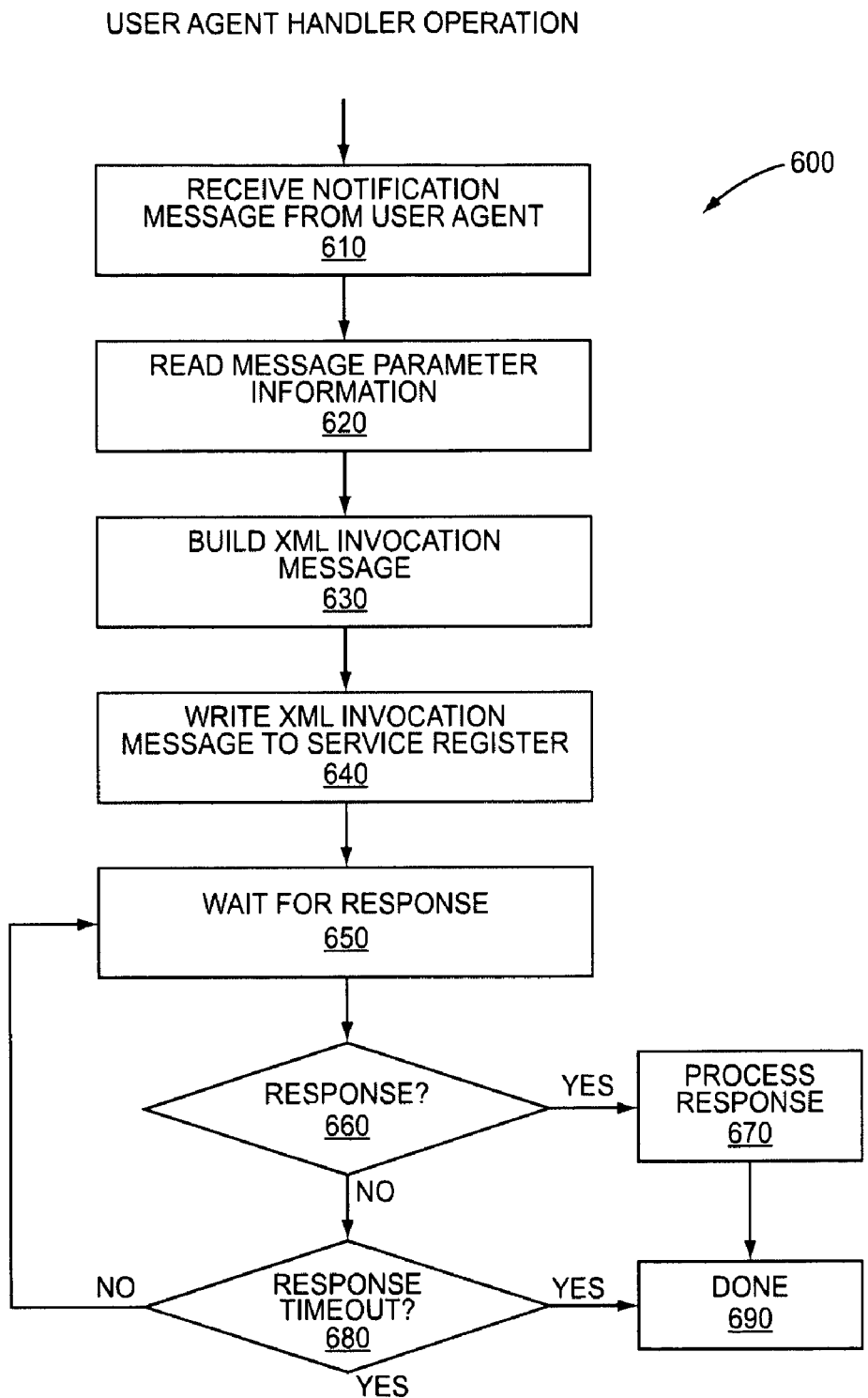
FIG. 6 is a flowchart depicting an exemplary process for operating the user agent handler of FIG. 5.

FIG. 6 is a flowchart depicting the operation of the user agent handler after it has been invoked at step 570 above. The user agent handler first receives a notification message from the user agent (at step 610). It then processes the information received at step 620 and builds an extensible mark-up language (XML) service invocation message corresponding to the incoming message (step 630). It should be noted that although the invocation message is described to be written in XML in this embodiment, the message may also be written in HTML or other mark-up languages. The invocation message is then sent to the service register (step 640).

The process 600 then continues in a series of iterative step in which the handler waits for the response from a service register module, at steps 650-680. If either the service register responds prior to the timeout of the handler's waiting period (step 660), or if the handler's waiting period times out (step 680), the process 600 ends (step 690). The timeout threshold may be set statically, such as 45 seconds, in which responses from all service registers are required to be submitted to the handler in that time span. The timeout threshold may also be set dynamically, so that a different threshold is set depending on which service register is requested.

Figure 7:
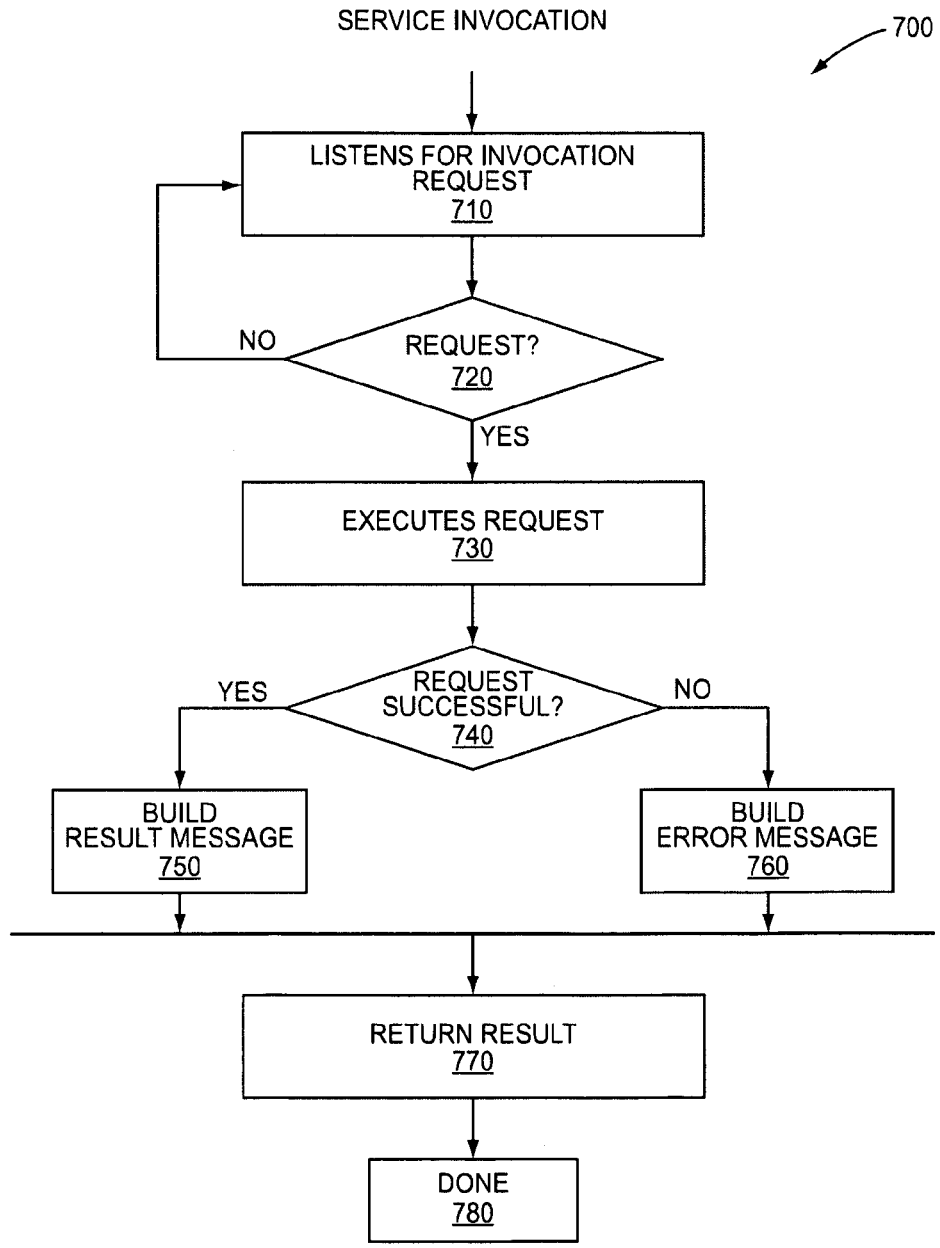
FIG. 7-7B is a flowchart depicting an exemplary process for providing a request over the IBOC network.

FIG. 7 is a flowchart depicting an exemplary process 700 performed by a native service register. A native service register must have embedded within it a executable module or procedure that is stored by the user device 140. According to the process 700, the user device 140 first receives the invocation message sent in step 640 of FIG. 6 above (step 710). It then checks to see if the incoming message is a request for service (step 720). If not, then the operation of service registers moves back to step 710 to wait for a next invocation message. If so, then the register executes the request at step 730. If the execution of the request is successful, when checked at step 740, a success message is built at step 750 and the result is returned at step 770 to the user agent handler. If the execution of the request is a failure when checked at step 740, an error message is built at step 760 and the result is returned at step 770 to the user agent handler. After the result is sent to the user agent handler, then the process 700 ends at step 780.

Figure 7B:
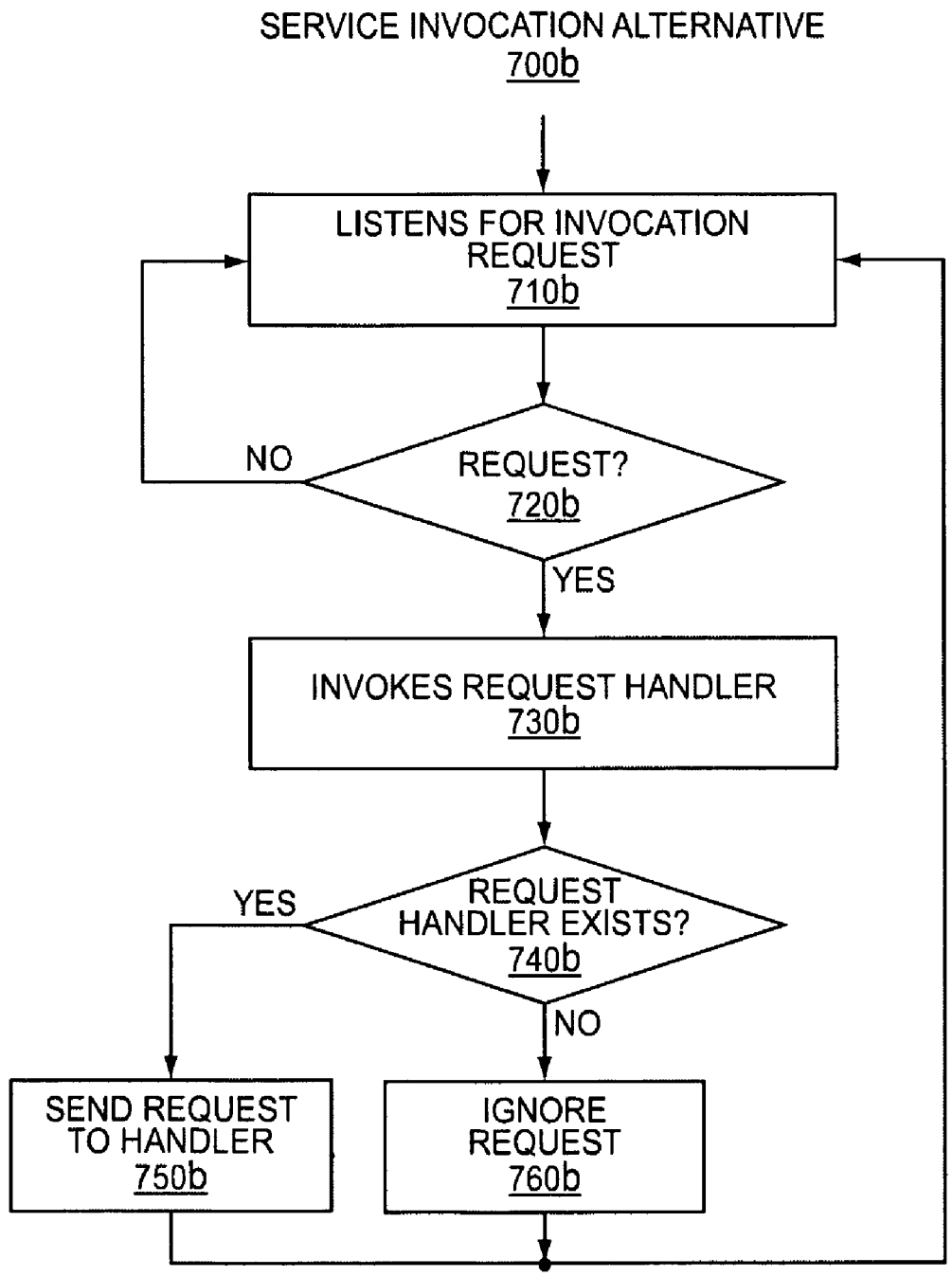

FIG. 7B illustrates non-limiting alternative embodiment service invocation instead of request 730, a request handler is invoked 730b. Upon invoking the handler, the system determines if the handler exists 740b, if the handler does not exist the request is ignored 760b and illastration continues 710b. If the handler does exist 740b, a request is sent to the handler 750b and illation continues 710b.

Figure 8:
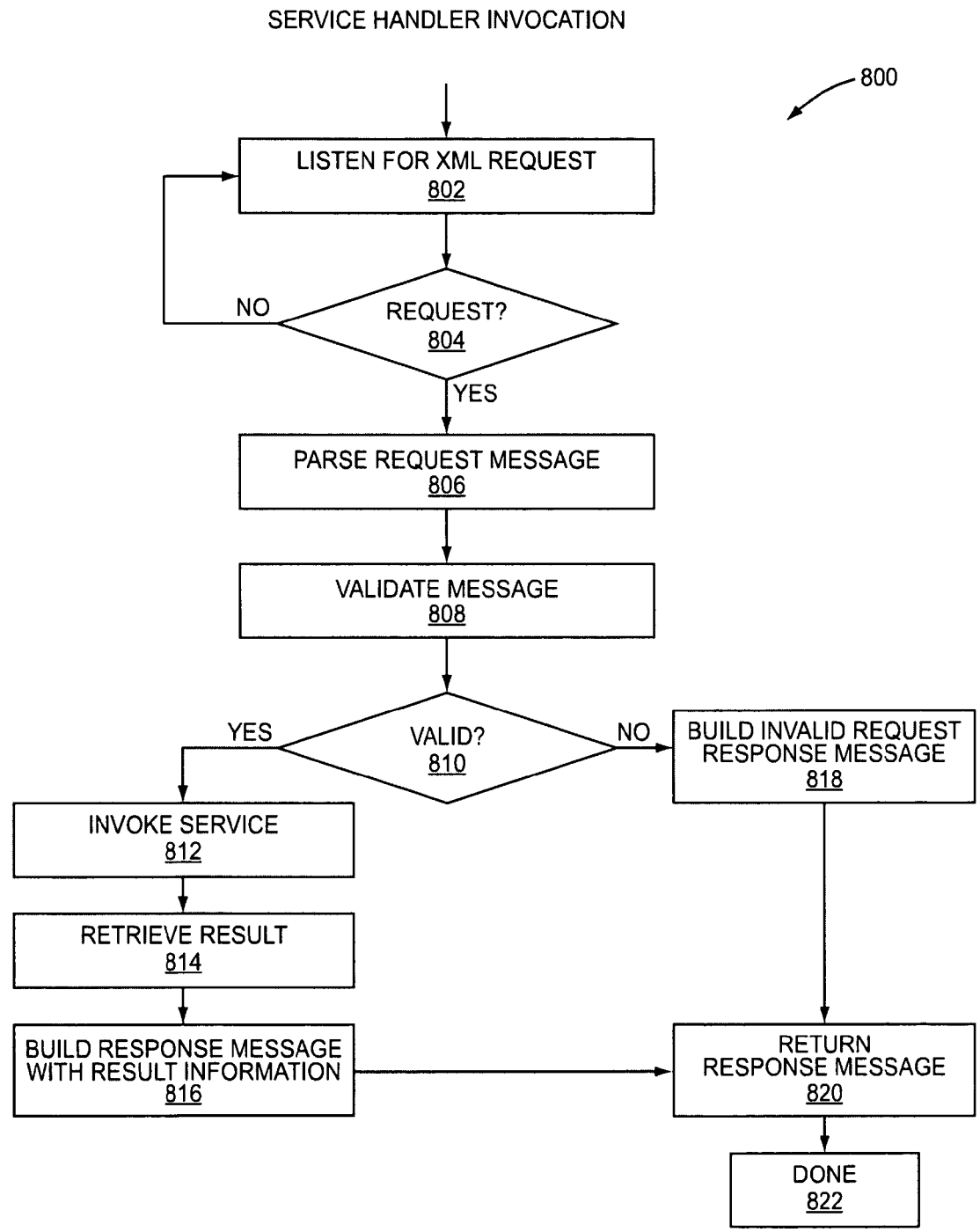
FIG. 8 is a flowchart depicting an exemplary process for invoking the service handler to accomplish a request.

FIG. 8 is a flowchart depicting an exemplary process 800 performed by a non-native service register. A non-native service register may not have embedded within itself an executable module or procedure, but rather it may be able to outsource the service request to other modules, which may or may not include other native service registers or a communication with an external device over a wireless or hard-wired network connection. Process 800 begins at step 802 wherein the non-native service handler receives the invocation message sent by the user agent handler at step 640 of FIG. 6 above. It then checks to see if the incoming message is a request for service (step 804). If not, then the operation of service registers moves back to step 802 to wait for the next invocation message. If so, then the request message is parsed according to the services required at step 806. Each parsed message is then validated at 808. If the message is determined to be valid at step 810, it is used to invoke a service module at step 812. The result of the service is monitored and stored at step 814. A response message is written with the result information at step 816 and at step 820 the response message is sent to the user agent handler. If the message is determined to be invalid at step 810, then an error response is built at step 818 and at step 820 the error response message is sent to the user agent handler. After the result is sent to the user agent handler, process 800 ends (step 820).

Figure 9:
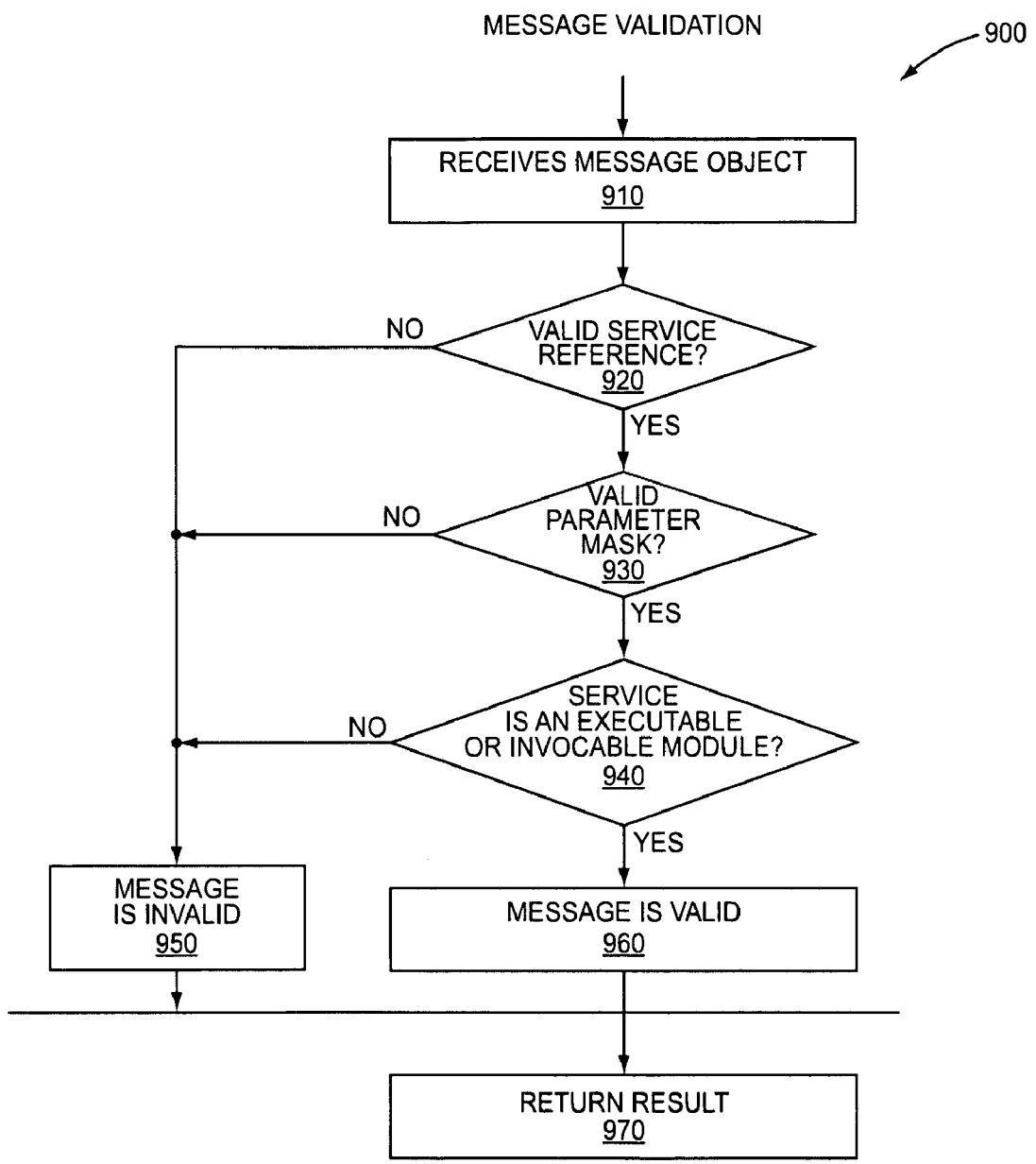
FIG. 9 is a flowchart depicting an exemplary process for validating a message transmitted through the IBOC network.

FIG. 9 is a flowchart depicting a process 900 by which a request message is validated. This validation process 900 is called at step 808 in FIG. 8. First, the request is sent by the service register by received by the validation module at step 910. The request message then undergoes a series of tests to see if the message has a valid service reference, a valid parameter mask, and a valid request so that the service is executable by an available software module. These tests are performed at steps 920, 930, and 940, respectively. If any of the test fails, the message is determined to be invalid at step 950, and an invalid result is returned (step 970). If the request message passes all the tests, the message is determined to be valid at step 960, and a valid result is returned. It should be stressed that the three tests in steps 920, 930 and 940 are only exemplary tests. Other embodiments of the present system may contain other tests or have fewer tests without moving away from the spirit of the inventive system.

In one embodiment of the current system, there are features that require sufficient security to insure that there is no data tampering when communications are in transmit. For example, in an embodiment of the present invention where the user is able to purchase audio CD's using the digital radio system, communications regarding the purchase order to and from the user, such as the initial order request from the user and the order confirmation to the user, should be adequately encrypted and authenticated The types of authentication used in the present system may be a one-way authentication, a two-way authentication, or a three-way authentication.

In a one-way authentication, the sender transmits a timestamp, a once value, and a particular user's private key along with the payload data A once value is a temporary value unique to all valid authenticated data. The receiver may then authenticate the information using the public key equivalent of the private key transmitted by the sender.

In a two-way authentication, in addition to going through one-way authentication, after decrypting the transmitted data, the receiver transmits a reply message to the sender containing a new timestamp, the original once value, ans a new once value. The reply message will be encrypted with the sender's public key encryption, which the sender may decrypt with the corresponding private key.

A three-way authentication may be used if the sending device and the user device 140 have not achieved synchronization. In addition to going through two-way authentication, after receiving the reply message, the sender transmits another reply to the receiver, containing the once value included in the first reply. After matching nonce values, the user device 140 may disregard the timestamps.

Figure 10:
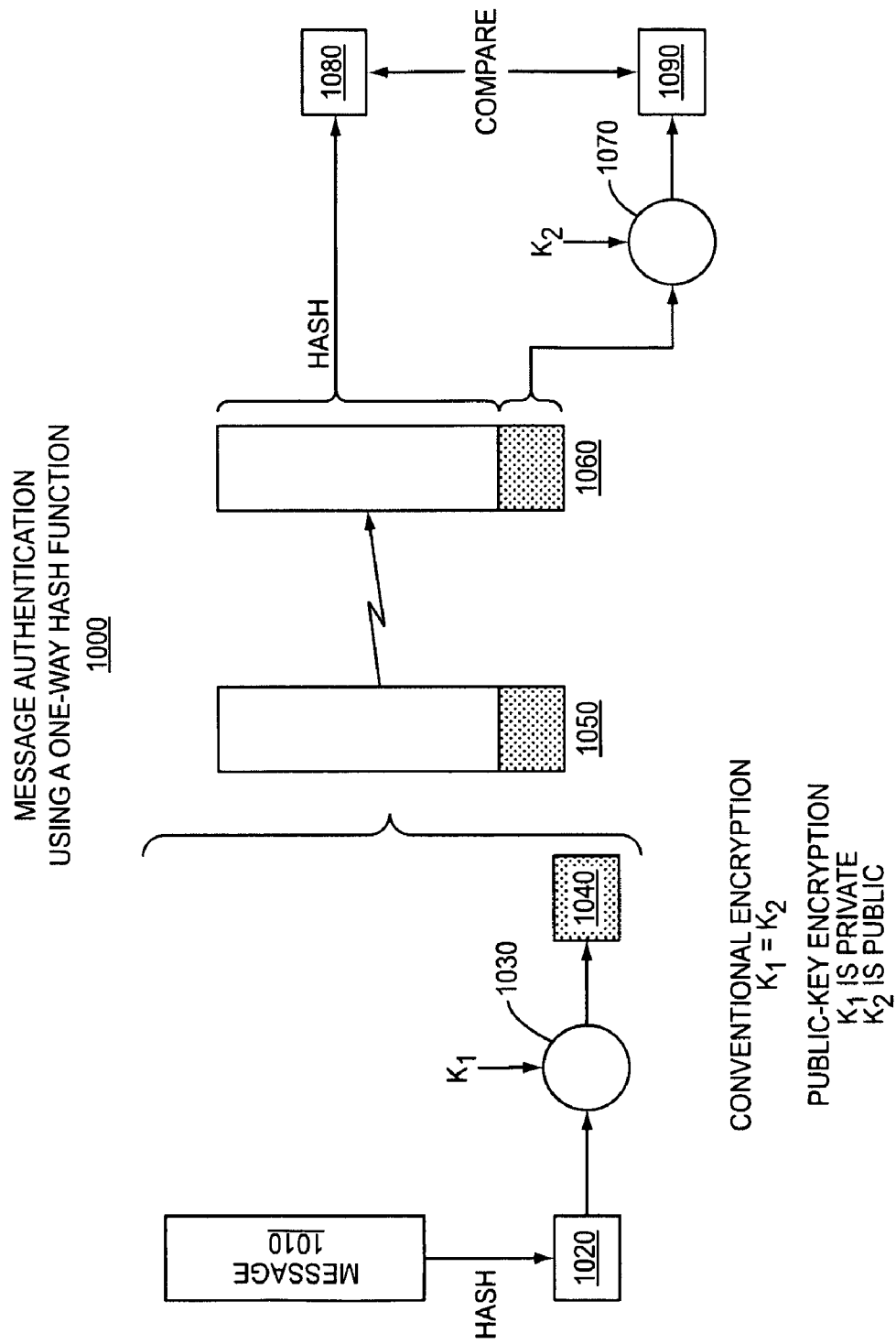
FIG. 10 is a block diagram of exemplary hardware and software used for message authentication with a one-way hash function.

FIG. 10 is a block diagram depicting an exemplary one-way authentication process 1000 using a hash function. At step 1010, a message is first processed with a hash function to create a message digest 1020. The message digest is then encrypted using a private key $K_1$ (step 1030). The private key $K_1$ is then added to the encrypted message as a header and a message digest with header is produced (Step 1040). The message digest with header is then attached to the original message to produce the message packet at step 1050, which is then transmitted to the user device 140 (step 1060). The message digest with header and the original message are then extracted from the received message packet by the user device 140. The header of the message digest will be detected by the corresponding public key $K_2$ (step 1070). The detected header will be used to re-hash the received original message (step 1080), and the re-hashed message digest is compared with the received message digest (step 1090). If the message is determined to be authentic then the re-hashed message digest will be the same as the received message digest. If the two do not match, then the message is determined to be inauthentic and the message is discarded. This effectively prevents tampering by an outside party during the transmission of the message, since changing of even one bit of the original message may result in a significantly different hash which will not be recognized by the user device 140.

Figure 11:
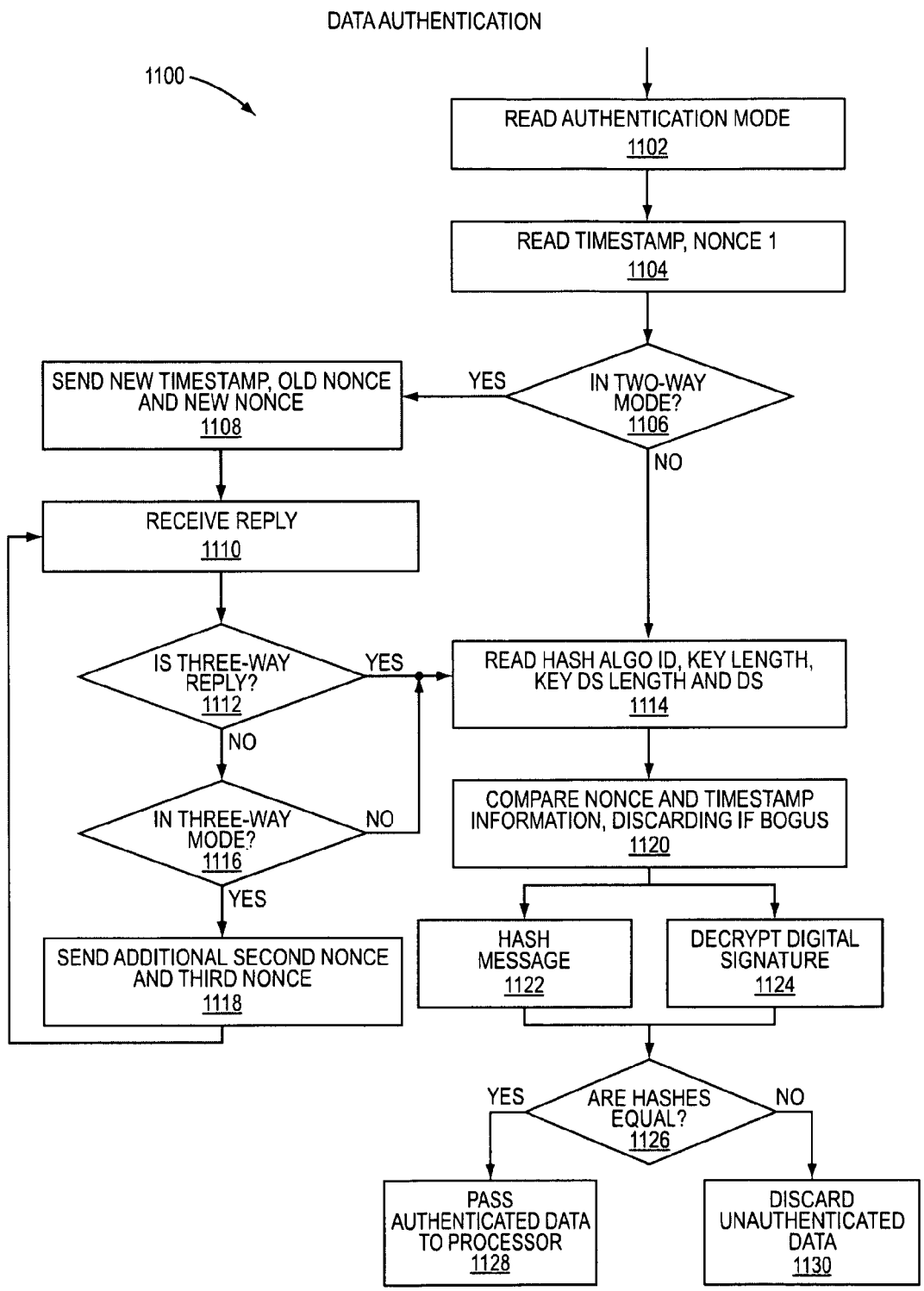
FIG. 11 is a flowchart depicting an exemplary process for authenticating data received over the IBOC network.
Figure 13:
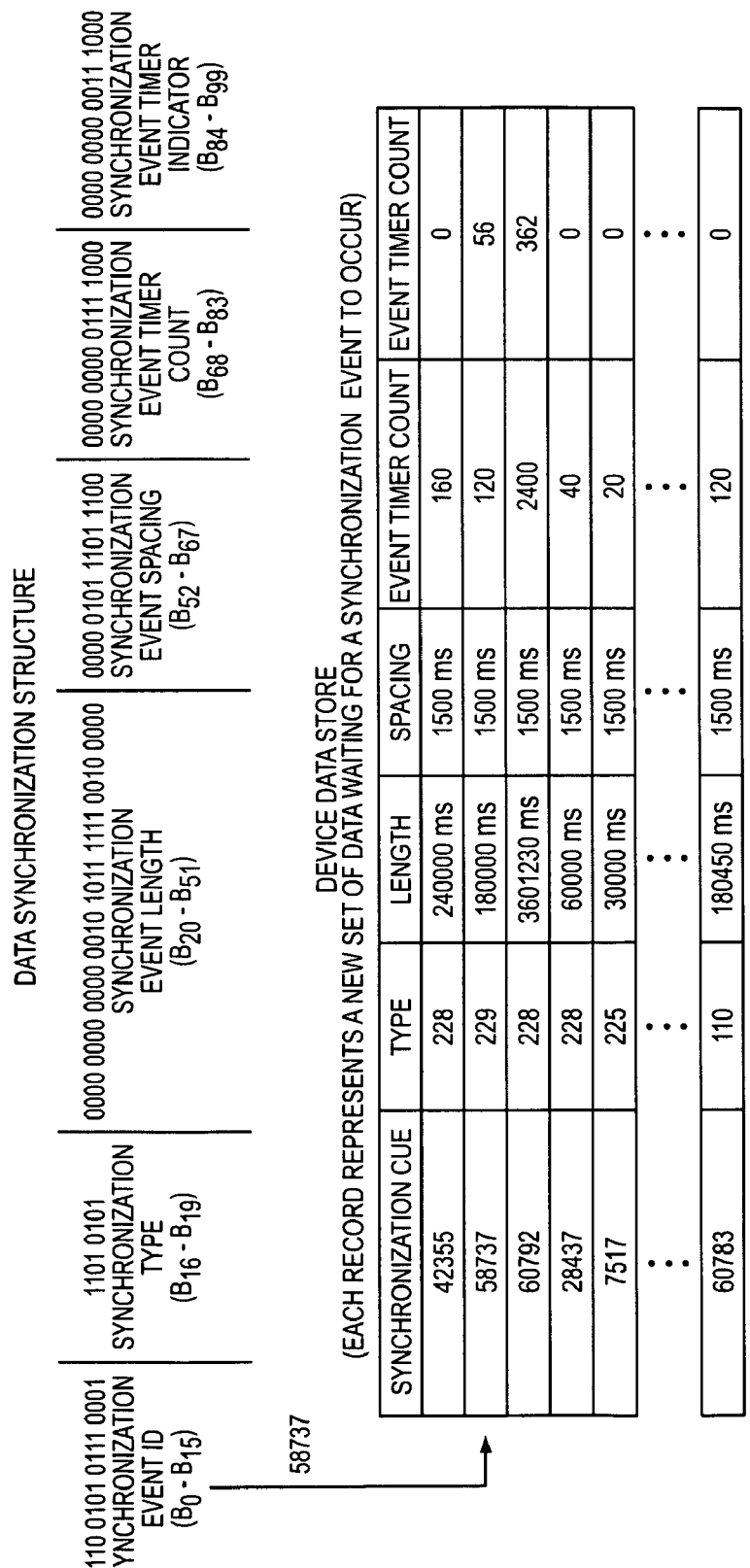
FIG. 13 is a block diagram depicting an exemplary data structure for accommodating synchronization of digital and audio data.

FIG. 11 is a flowchart depicting an exemplary process 1100 for authentication performed by the user device 140. The user device 140 first detects an incoming signal and reads it to determine the current authentication mode (step 1102). Next, the user device 140 detects and reads the timestamp value, the nonce, and various other header information necessary for authentication and stores them in memory (step 1104). The receiver then may confirm the authentication mode (step 1106). If the current authentication mode is the one-way mode, the receiver then proceeds to step 1114, discussed further below. If the current authentication mode is not one-way, then the authentication mode may be two-way or more, such as three-way. In such event, the process 1100 continues to step 1108 where the user device 140 transmits to the sender a new timestamp, the original nonce and a new nonce, as per the process of two-way authentication discussed previously above. The receiver then waits for a reply message from the sender (step 1110). The reply message may be an acknowledgment from the sender for receiving the new timestamp and the new nonce, or it may be an additional nonce for further multiple-way authentication. The receiver makes that differentiation at step 1112.

If the reply is an acknowledgement, then the authentication mode is determined to be two-way authentication, and the receiver proceeds to step 1114. If the reply is not an acknowledgement, the user device 140 examines the incoming reply to determine whether the current authentication mode is three-way at step 1116. If the reply is not further authentication information, then the process moves once again to step 1114. If the reply contains further authentication information, then the receivers transmits additional nonces (step 1118) and will receiver additional replies by moving back to step 1110 after step 1118. It is noted that although in the current discussions the most numerous multiple-way authentication mode is three-way mode, n-way authentication mode can be achieved by executing the iteration comprised of steps 1110, 1112, 1116 and 1118 n times.

At step 1114, the receiver detects and reads the hash algorithm ID, the key length, any digital signature information, and any other data necessary to decrypt the incoming message. These data fields will be discussed at length in the description of FIG. 12. If the authentication mode of the incoming message is two-way or more, then the timestamp information and the nonce information from the sender and the receiver will be compared as the first step of authentication (step 1120). Otherwise, the message is discarded if the timestamp and nonce information do not match. If the information does match, then the incoming un-hashed message is hashed at step 1122 and the incoming hash digest in decrypted at step 1124. The two results are compared at step 1126. If the results are equal, then the data is authentic and the message is passed onto the various other parts of the user device 140, such as the user handler, at step 1128. If the results are not equal, then the data is determined to be inauthentic and the message is discarded at step 1130.

FIG. 12 is a block diagram depicting an exemplary authentication header 1200 that may be used in the process 1100 depicted in FIG. 11. The different fields 1202-1238 in the header 1200 may be arranged in the same order that they will be detected by the receiver.

The authentication mode field 1202 is used to indicate the current authentication mode, that is whether it is one-way, two-way, three-way, or other multiple-way modes.

The timestamp 1206, first nonce value 1210, and second nonce value 1214 are information used in the authentication process 1100. Although in this particular embodiment, two nonce values are allotted, it would be fairly clear to one of ordinary skill in the art to increase the number of nonce value fields in the header so to increase the multiple-way authentication that may be used, as described previously herein.

Hash algorithm ID 1218 is a code for the hash algorithm used by the sender. This is used by the user device 140 to hash the un-hashed message in order to compare it against the decrypted hash digest message. The key length 1224 indicates the length of the public key that will be used to decrypt the hash digest, while public key 1228 contains the actual public key.

Digital signature length 1232 indicates the length of the digital signature and the digital signature field 1236 contains an indication of the user's identity which may be encrypted or signed by the sender. Items 1204, 1208, 1212, 1216, 1220, 1226, 1230, 1234, 1238 are examples of each of respective fields 1202, 1206, 1210, 1214, 1218, 1224, 1228, 1232, and 1236 in the authentication header.

Quality of Service (QoS) Management

Different degrees of reliability with respect to transmission of data over an IBOC broadcast are termed "Quality-of-Service" (QoS). In an IBOC system, a data channel is composed of an infinite number of RF carriers, that are specific frequencies adjacent to central frequency over which analog data is broadcast. A finite number of these RF carriers may be used to reliably broadcast over a reasonable distance. Mainly due to the susceptibility of interference, some RF carriers can send large amounts of data over long distances ith little chance of error, while others cannot. The RF carriers become more unreliable depending upon their proximity to central frequency analog data, or adjacent frequency data.

Since the entirety of the data channel is available for broadcasting, the broadcaster may subdivide the data being broadcast into data that needs to be transmitted with high speed and efficiency and that which does not require high speed or efficiency.

The focus of QoS system is the management of these sub-channels, and corresponding pricing for data, such as advertisements, based on the reliability and speed of different parts of the channels. Data services will request sub-channels for broadcast of equal sized data service packets containing data blocks. A data service is a collection of similarly purposed data, such as a communication of data between two parties. A data service packet represents a single unit of data for a particular data service and assembled from the individual data service packet segments, being all of the data within the data block for a particular service. A data service packet transmission may be interleaved over time to reduce distortion of the data being broadcast. A data block is a physical series of data bits, created from one or more of the RF carriers on a radio channel over a given period of time. The beginning of the block may be indicated by a recognizable signal pattern, which may be referred to as a synchronization pulse. The data block will consist of all the radio frequency carriers being read by the user device 130 for $n^{th}$ millisecond over a larger period of time. All of the data for a block for a given RF carrier may be referred to as a block segment. A single data block may carry data for more than one data service, which in turn may be identified by a series of header bits.

The reliability of a sub-channel can be determined by the number of RF carriers used, or the size of the sub-channel, and the positions of the individual RF carriers on the spectrum in relation to the main data channel. Each RF carrier may be indexed 1 through n. The most robust RF carrier is 1, and a formula is used to determine the relative reliability of each subsequent RF carrier. The result of this formula is referred to herein as a "QoS Rating". In an exemplary method, the average QoS Rating of the sub-channels may be used to determine the "QoS Level" of that sub-channel. Given both the desired number of sub-channels and the desired QoS Level for each sub-channel, as requested by the data service, such sub-channels may be dynamically allocated in order to satisfy that demand.

A transmission proxy acts as the controller between data services and the data channel. A data service will make a request to the transmission proxy with all of the parameters for sending the data, encapsulated in a data service object. The transmission proxy then communicates with the QoS Manager (described below) for a sub-channel object, and thereby inserts the data into the channel.

In an exemplary process, there exists three methods by which RF carriers can be grouped into sub-channels. These are as follows: (i) static, wherein the sub-channels are pre-defined before a data service is given access; (ii) dynamic, wherein the sub-channels are defined at the time of the request for a QoS Level sub-channel; and (iii) hybrid, wherein the selection of RF carriers is both static and/or dynamic. In a static scenario, the data service makes a request for the sub-channel with a desired QoS Level, and if that sub-channel is available it is returned. Otherwise, an error message is returned. If a valid handle is returned, the data service will then use the sub-channel to transmit data, and the sub-channel is considered allocated. Upon completion of the data service use of a sub-channel, the sub-channel does not have to be freed because it is statically defined.

In a dynamic scenario, if a collection of RF carriers is available produce a sub-channel with the desired QoS Level at the time of the request, the RF carriers are grouped and the handle for the sub-channel is returned. Otherwise, an error message is returned. When the data service has completed using the sub-channel, it must be returned in this dynamic environment. In a hybrid scenario a pre-defined number of sub-channels are static and the remaining RF carriers utilize a dynamic scenario.

The QoS Manager interacts with a transport system, or other communication system such as a modem operating in conjunction with an application program interface (API), in order to gain access to sub-channels and allocate them appropriately. The transport, or modem may be any device that creates the waveforms on the RF carriers. The API provides a low level interface to the functions of the modem, such as asking for percentages of a given sub-channel, or acknowledging the status of a given sub-channel. The QoS Manager must be able to create all of the three above mentioned groupings of RF carriers into sub-channels and maintain a pool of RF carrier objects produced by the modem that hold information regarding the reliability and status of the RF carrier or sub-channel it represents.

There exist at-least three statuses for a sub-channel object: busy; available; and killed. A static object will be killed when the dedicated configuration has been compromised by other dedicated configurations. A dynamic object will be killed when the channel can no longer support that level of bandwidth without compromising service on other sub-channels. Eventually these killed sub-channels will be removed from the pool of sub-channels by the QoS Manager. The object may also have a lease time, during which it becomes busy and no other process may use it. If the object has not been returned to the pool by the end of the aforesaid lease time it will automatically be returned to the pool by the QoS Manager. The QoS manager may also periodically recycle sub-channel objects when they are not in use, which requires destroying and re-building them.

Figure 14:
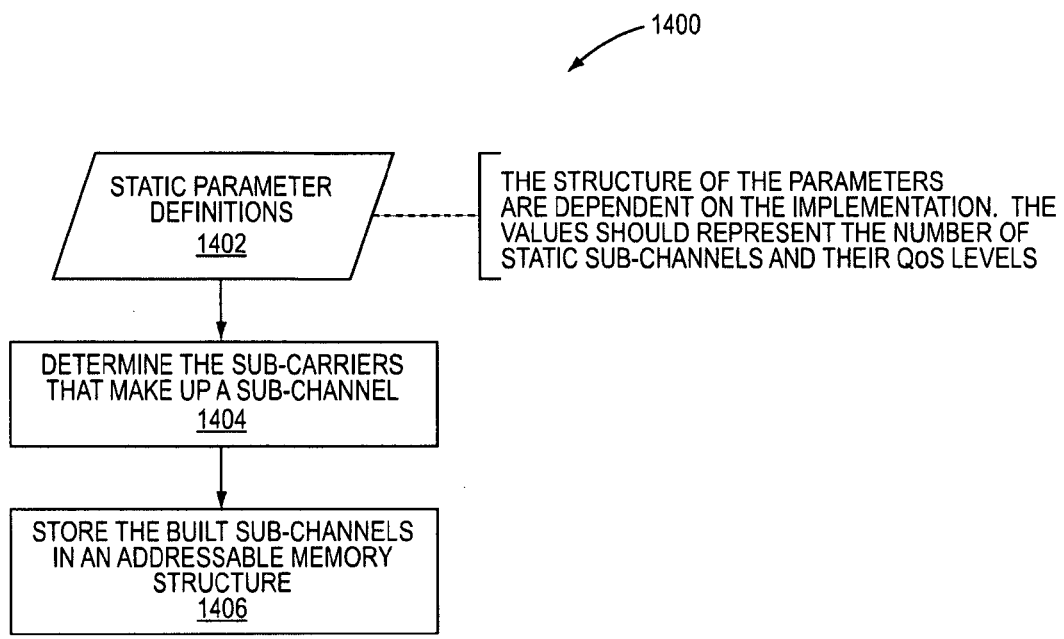
FIG. 14 is a flowchart depicting exemplary operation of a static Quality-of-Service manager.
Figure 15:
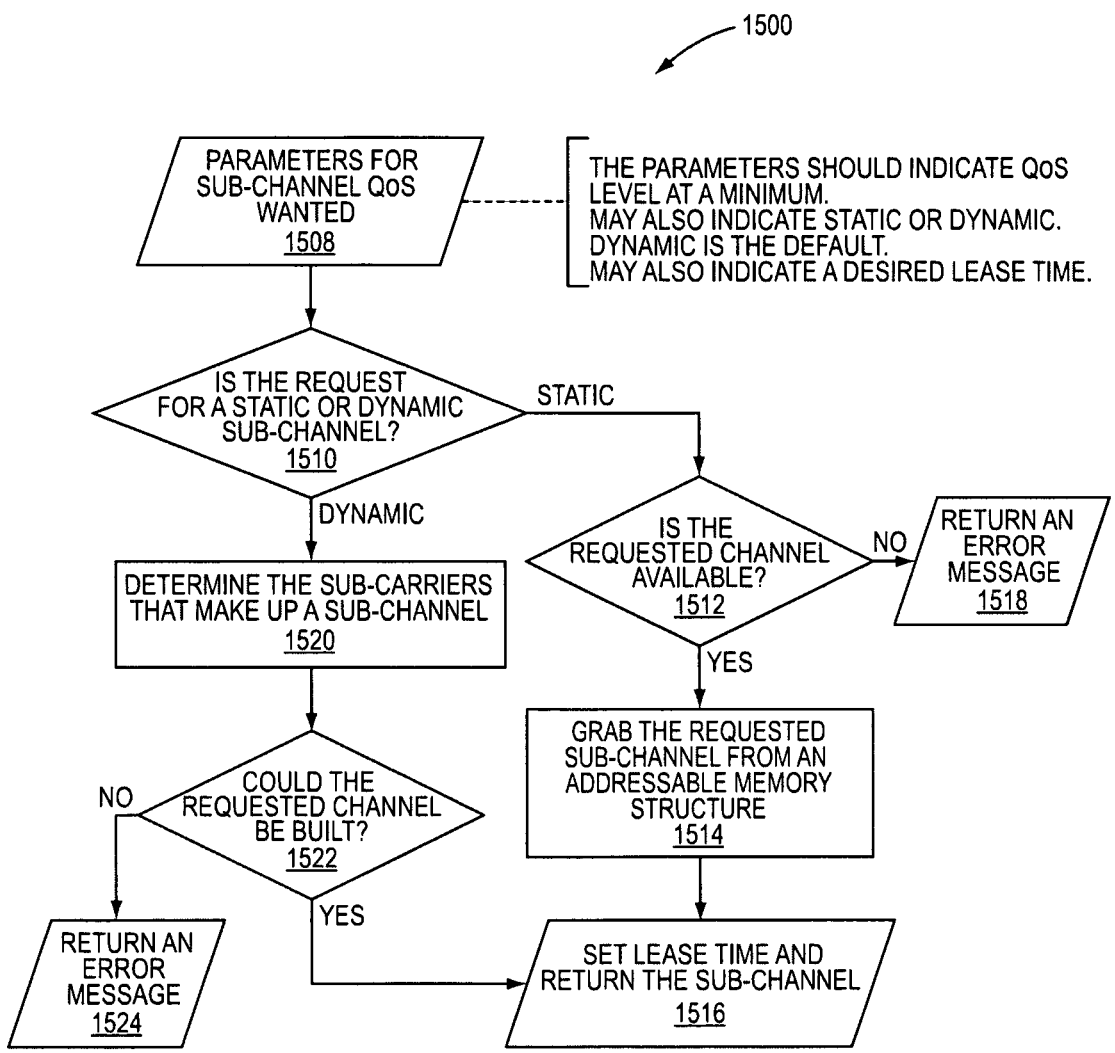
FIG. 15 is a flowchart depicting exemplary operation of an active Quality-of-Service manager.

FIGS. 14 and 15 describe the exemplary structure and method for initialization, selection and assignment of sub-channels and RF carriers based on Quality of Service definitions according to the present invention. FIG. 14 displays an exemplary process 1400 for initialization of sub-channels based on static parameter definitions which are examined at step 1402. From these definitions, the available sub-channels are determined at step 1404. Furthermore, the sub-channels are stored in an addressable memory structure at step 1406, after which process 1400 ends.

FIG. 15 provides an exemplary process 1500 for the selection and assignment of sub-channels based on parameters defining the quality of service desired, which are examined at step 1508. These parameters are used to determine whether the request for a sub-channel is static or dynamic (step 1510). If the request is static, the availability of that specific channel is further determined at step 1512. If the requested channel is available, it is retrieved from an addressable memory structure at step 1514. The addressable memory structure used at step 1514 may be the same memory used at step 1406. Following retrieval, a lease time is set and the sub-channel identification is returned to the entity that requested it at step 1516.

If, on the other hand, the requested channel is not available, an error message is returned to the entity that requested it at step 1518.

If the request is for a dynamic sub-channel at step 1510, the available sub-channels are determined at step 1520. The ability to create the requested sub-channel is further determined at step 1522. If the requested sub-channel can be built then a lease time is set and the sub-channel is returned to the entity that requested it at step 1516. If the requested sub-channel cannot be built, an error message is returned to the entity that requested it at step 1524.

FIG. 16 is a description depicting an exemplary Java interface structure for the QoSManager 1610, that handles the creation of sub-channels and the level of service for a sub-channel. Furthermore, it is the point of entry for data services requiring a sub-channel to send data The interface QoS Manager includes a getSub-channel( ) command 1620 that returns a sub-channel of a specific QoS level, or returns null if the specified sub-channel cannot be returned. In addition, the method detail of the QoS Manager 1630 provides exemplary parameters for each element in the interface device method summary.

FIGS. 17A-17B are descriptions depicting an exemplary Java interface structure for an Interface RF carrier 1702, that handles the reading and writing of information onto a particular RF carrier comprising a groups of sub-channels. The interface RF carrier 1702 first involves clear( ) function 1704, which is an initialization function that empties the RF carrier of all data and returns it to the RF carrier pool. The getQoS-Rating( ) function 1706 assigns a rating to the RF carrier based on reliability. This rating may be used to determine the speed of data transfer onto the RF carrier as well as the data volume. The read( ) function 1708 reads data from the RF carrier, while the write( ) function 1710 writes data onto the RF carrier.

The getQosRating( ) 1712 function is a public function that has no input arguments and may return the RF carrier's rating as an integer. The read( ) function 1714 is a public function that has argument array which includes the data read from the RF carrier and an integer representative of a number of bytes requested to be read. It returns the number of bytes actually read as an integer.

The write( ) function 1716 is a public function that has argument array which is the data to be written to the RF carrier. It returns the number of bytes actually written as an integer.

The clear( ) function 1718 is a public function that has no input arguments and returns nothing. Instead, it initializes the RF carrier by emptying it of all data and returning it to the RF carrier pool so that it can available for future use.

FIG. 18 is a description depicting an exemplary Java interface structure for an Interface RF carrierFactory 1802, which handles requests to create new RF carriers within the transmission band. The interface RF carrierFactory 1802 involves the function newRF carrier( ) 1804 which creates a new RF carrier with a specified QoS rating.

The function newRF carrier( ) 1806 is a public function that has an integer input argument rating, which specifies the QoS rating of the new RF carrier. This function returns the object RF carrier, which may be a pointer or a memory location with floating data type containing the frequency of the new RF carrier.

FIGS. 19A-19B are descriptions depicting an exemplary Java interface structure for the Interface RF carrierPool module 1902, which handles the locking and unlocking of RF carriers for use by a sub-channel. This interface prevents unnecessary reconstruction of RF carriers by the interface RF carrier Factory 1802 previously discussed.

The interface RF carrier Pool 1902 involves the checkIn( ) function 1904, which is a function that notifies the RF carrier pool that a particular RF carrier object passed through as its input argument is available for checkout.

The checkout( ) function 1906 moves a RF carrier with a particular QoS rating from the RF carrier pool to use by a sub-channel. The GetAvailableRating( ) function 1908 returns the QoS ratings of the available RF carriers currently in the pool. The function GetCount( ) 1910 returns the current size of the RF carrier pool. The method detail of the interface RF carrier Pool 1902 further describes the functions used by the interface. The function checkout( ) 1912 is a public function that has an integer input argument qosRating, which specifies the QoS rating of the requested RF carrier. A RF carrier object is returned. The function throws to an error message when no RF carrier with the input Qos rating is available in the pool. The function checkIn( ) 1914 is a public function that has a RF carrier object input argument subc whose frequency, QoS rating, and other attributes will be listed in the pool so that the RF carrier is made available for checkout. The function returns to an error message if there is already a RF carrier in the pool with the same QoS rating, so to reduce unnecessary check-ins and check-outs.

The function getAvailableRatings( ) 1916 is a public function that has no input arguments, but it returns an integer array storing the available QoS rating when the function is called.

The function getcount( ) 1918 is a public function that also has no input arguments, but returns an integer that represents the current size of the RF carrier pool, or the number of RF carriers available, when the function is called.

FIGS. 20A-20B are descriptions depicting an exemplary Java interface structure for the interface sub-channel 2002 which handles data services to send data to a channel or receiving data from a channel. The interface sub-channel 2002 includes a destroy( ) function 2004, which removes all data from a particular channel and returns all the RF carriers that the sub-channel is comprised of.

The function getInputStream( ) 2006 gets the data stream that is used to read data from the sub-channel. The function getOutputStream( ) 2008 gets the data stream that is used to send data to the sub-channel. The function getQoSLevel( ) 2010 gets the QoS rating of the sub-channel currently in use.

The function GetOutputStream( ) 2012 is a public function that has no input arguments. When called, it returns an OutputStream( ) object that contains the data that will be sent to the sub-channel. The function returns an error message if the output stream cannot be returned. Such a condition occurs if the output stream does not exist or is otherwise busy. The function GetInputStream( ) 2014 is a public function that operates similarly to the function GetOutputStream( ) 2012. GetInputStream( ) 2014 also has no input arguments. When called, the function returns an InputStream object that will be used to store the data read from the sub-channel. The function returns an error message if the InputStream object cannot be returned. Such a condition occurs if the input stream does not exist or is otherwise busy.

The function getQosLevel( ) 2016 is a public function that has no input arguments and returns the QoS rating of the sub-channel as an integer.

The function destroy( ) 2018 performs the cleanup work required to inactivate a sub-channel. When called, the function removes all data from the sub-channel, dissembles the sub-channel into various RF carriers and returns an array of integers that indicate the particular RF carriers that were extracted from the sub-channel These RF carriers may be made available to other sub-channels once they are returned to the RF carrier pool using such interface as the RF carrier-Pool interface 1902.

FIG. 21 is a description depicting an exemplary Java interface structure for the interface Sub-channelFactory 2102, which is called to create new sub-channels from available RF carriers. The interface uses the function newsub-channel( ) 2104 to create a new sub-channel using a particular group of RF carriers. The function newSub-channel( ) 2106 is a public function that has an input argument of an array of RF carrier objects. These RF carrier objects are to be used by the function to create the new sub-channel. This function 2016 returns a sub-channel object that is ready to be used in the system by such interfaces as interface SubChannel 2002. The function 2-16 generates an error message when the sub-channel cannot be created by the RF carriers indicated by the input array. This may occur when the RF carriers indicated by the input array is not available in the RF carrier pool, such as when these RF carriers are used by another sub-channel.

FIGS. 22A-22B are descriptions depicting an exemplary Java structure for the interface Service 2202, which allows a receiver to handle the incoming information. The interface Service 2202 involves the function Authenticate( ) 2204, which confirms the authenticity of the sender by matching timestamps and nonces with the process described by FIG. 11. The function getInputstream( ) 2206 is the same process as the function 2206 described previously. Similarly, the function getOutputStream( ) 2208 is the same process as the function 2008 described previously. The function getServiceMetaData( ) 2210 is used to read the incoming header and other information. The specifics of the function will be discussed in the descriptions for FIGS. 24A-24C below. The function setServiceMetaData( ) 2212 reads the information received by getServiceMetaData( ) 2210 and configures the receiver unit accordingly. The function getServiceMetaData( ) 2214 is a public function that has no input arguments and it returns a class of type ServiceMetaData when called. The particular fields in the class ServiceMetaData will be discussed in the descriptions for FIGS. 24A-24C. The function setServiceMetaData( ) 2216 is a public function that has no input arguments and returns nothing. When called, it configures the receiver according to the ServiceMetaData class recorded by getServiceMetaData( ) 2214. The functions getOutputStream( ) 2218 and getInputStream( ) 2220 are the same functions as getOutputStream( ) 2012 and getInputStream( ) 2014, described previously above. The function Authenticate( ) 2222 is a public function that has the input argument of type "devicekey" which is an object that maybe used identify the particular sender of the transmitted data. The function returns nothing, but it throws to an error message if unauthentic information is found. FIG. 23 is a description depicting an exemplary Java structure for the interface ServiceListener 2302, which is responsible for delegating the construction of sub-channels and handing them off to the appropriate handler objects. To accomplish this, the interface ServiceListener 2302 must have access to interfaces RF carrierPoll 1902 and Sub-channelFactory 2102. The interface ServiceListener 2302 also requires data on the services currently that are actively being received. Such data is supplied by the function getServices( ) 2304 that returns an array that contains information on the services that are actively being received.

FIGS. 24A-24C are descriptions depicting an exemplary Java structure for the Interface ServiceMetaData 2402, which extracts the header information from the incoming data stream described in FIG. 4. The interface ServiceMetaData 2402 uses a separate function to extract each block of header described in FIG. 4. The function getCategory( ) 2404 is a function that extracts the Content Category 412 in the header. Because Content Category is a group of 5 bytes indicating 5 levels of content scope, getCategory( ) 2404 has an input argument of integer type so that only the byte associated with the specified level is returned. The function getContentRating( ) 2406 is a function that extracts the Content Rating 410 in the header. The function getDataSize( ) 2408 is a function that extracts the File Size Number 414 in the header. The function getDataSizeMagnitude( ) 2410 is a function that extracts the File Size Magnitude 418 in the header. The function getDomainID( ) 2412 is a function that extracts the Domain ID 408 in the header. The function geteventIndicator( ) 2414 is a function that extracts the Event Indicator 426 in the header. The function getGroupID( ) 2416 is a function that extracts the Group ID 428 in the header. The function getMimeType( ) 2418 is a function that extracts the Mime Type 430 in the header. The function getReceiverTimeStamp( ) 2420 is a function that extracts the Receiver Time Stamp 406 in the header. The function getReservedBits( ) 2422 is a function that extracts the reserved bits 420 in the header. The function getSenderTimeStamp( ) 2424 is a function that extracts the Sender Timestamp 404 in the header. The function getStatusBits( ) 2426 is a function that extracts the Status Bits 422 in the header. The function getSyncCue( ) 2428 is a function that extracts the Synchronization Cue 402 in the header. The function setReceiverTimeStamp( ) 2430 does not extract any information from the header, but configures the receiver so that the receiver will transmit the timestamp stored in the input argument "tStamp." After all the information is extracted from the incoming data, the interface ServiceMetaData 2402 stores the extracted data in a class with fields that correspond to the functions used by the interface, and that each field stores the header data extracted from the incoming data stream by the corresponding functions. This class can be used by other interfaces, such as interface service 2202.

In the operation of radio systems including the present invention, there are numerous repetitions of the same audio data. Music are often repeated numerous times in the course of one day, and commercials can be repeated numerous times in a matter of minutes or hours. Therefore, it would be prudent for the receiver to record a number of these audio data in temporary memory location so to reduce the transmission data load while maintaining the operation of the system. The present invention accomplishes this data recording by transmitting a synchronization cue to create an "audio cul-de-sac" that is recognized by a receiver, such as user device 140, and stored in a buffer or memory of the same. The audio cul-de-sac stored by user device 140 may also be multimedia information that a user can recall at any desired time.

Figure 25:
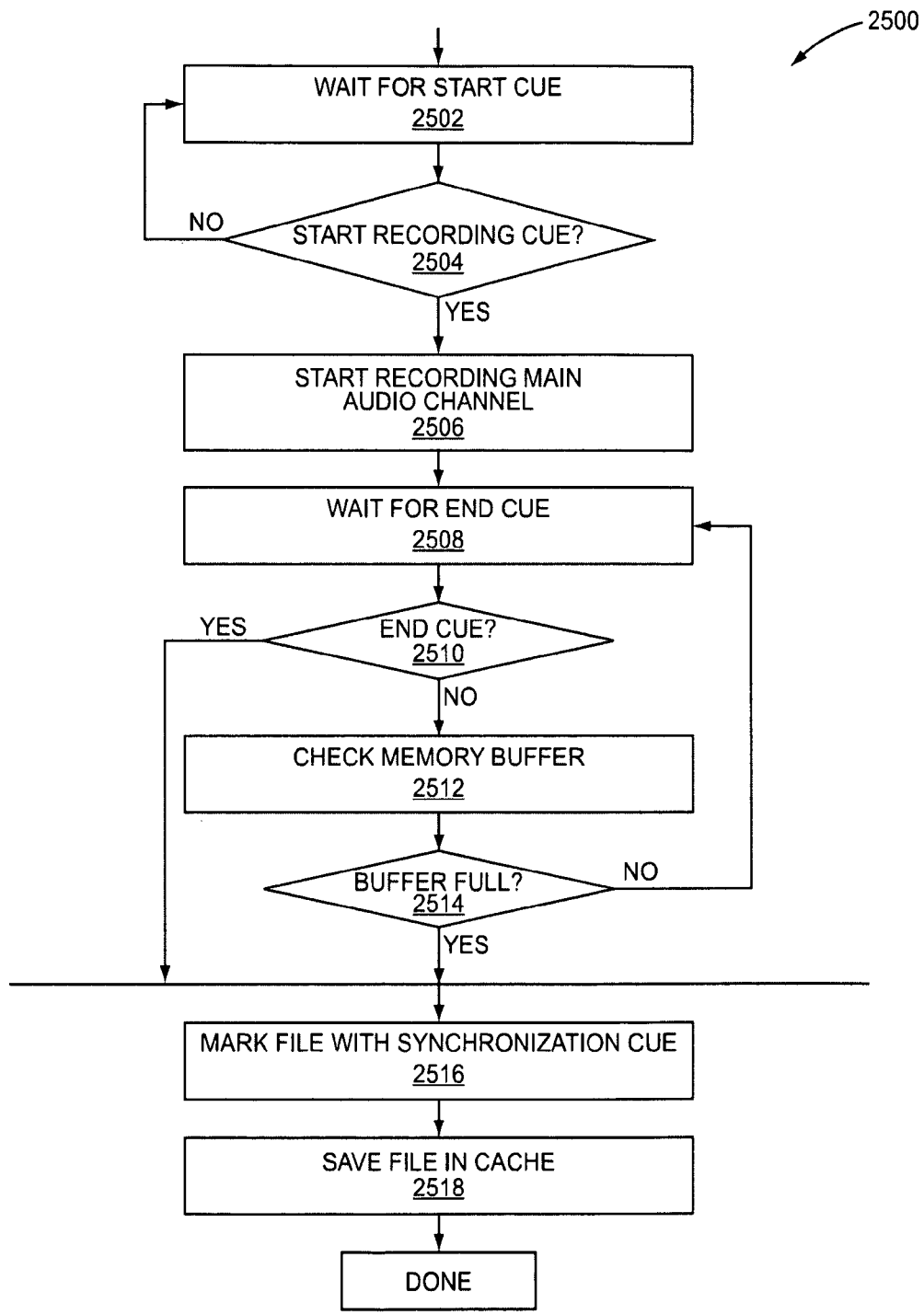
FIG. 25 is a flowchart depicting an exemplary process for using a synchronization cue to create an audio cul-de-sac.

FIG. 25 is a flowchart depicting the operation for using a synchronization cue to create an audio cul-de-sac. It is advantageous to use a synchronization cue to create an audio cul-de-sac because the synchronization cue contains data that identifies the multimedia data that will be recorded. The receiver first waits for a synchronization cue at step 2502. When a cue is received, a check is performed at step 2504 to ascertain if the cue is a cue to signal the start of recording. If not, the user device 140 returns to step 2502. If so, then the user device 140 starts to record multimedia data at step 2506. While the multimedia data is being recorded, the user device 140 may also check for another synchronization cue at step 2508. If the cue is determined to be an end cue at step 2510, then the user device 140 stops recording the audio data. If the cue is not an end cue, then buffer check is done by the receiver at step 2512. If the buffer is determined to be full at step 2514, then the receiver also stops recording. If the buffer is not full, then the receiver returns to the state at step 2508 and waits for a synchronization cue. This process insures that the recording of multimedia data is stopped when an end cue is received or when the buffer has reached full capacity, which ever occurs first. After the recording, the data file in the buffer is marked with the synchronization cue that started the recording process, at step 2516, so that the file is identified, and the file is saved in cache at step 2518.

Figure 26:
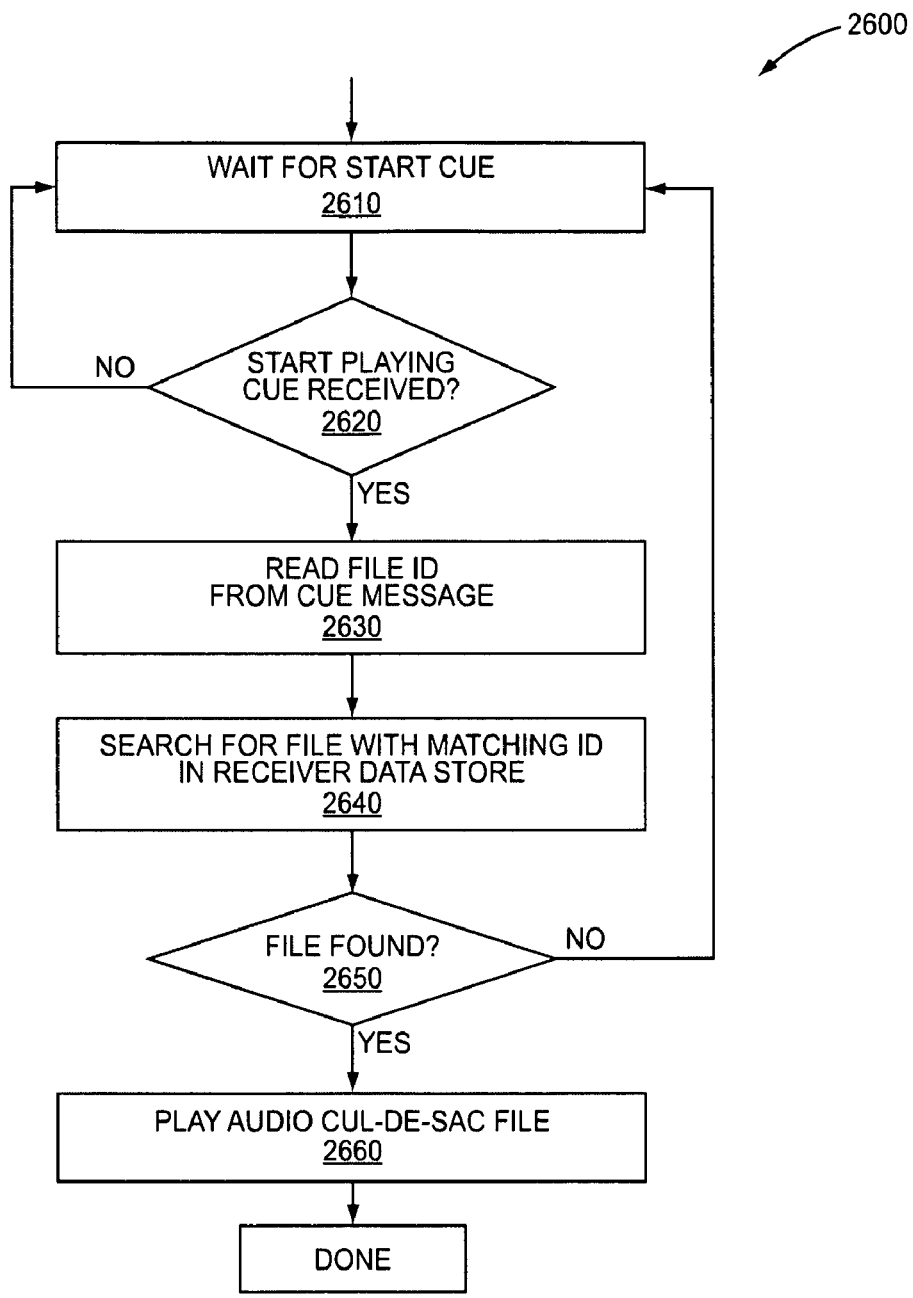
FIG. 26 is a flowchart depicting an exemplary process for using a synchronization cue to trigger an audio cul-de-sac.
Figure 27:
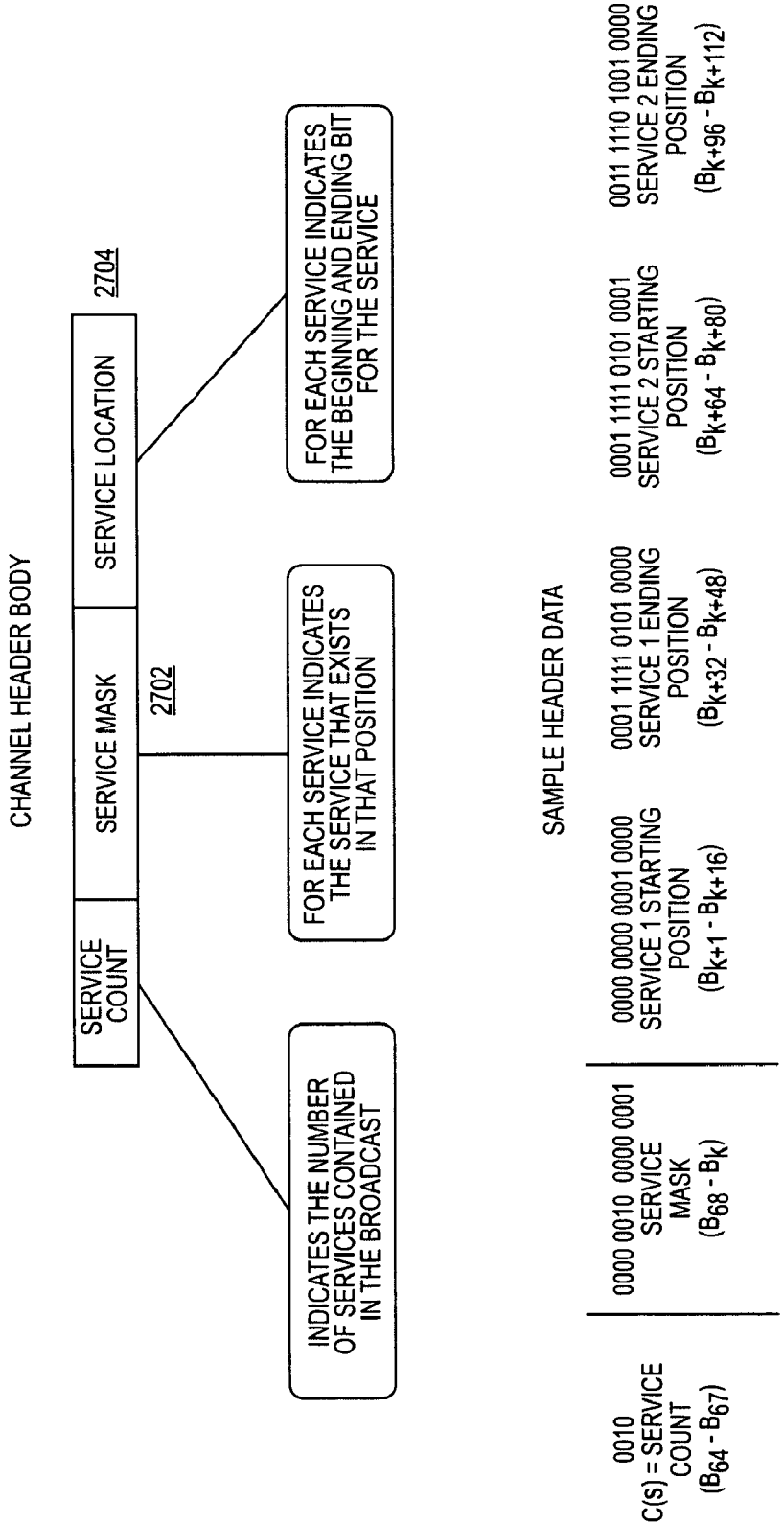
FIG. 27 is an illustration depicting an exemplary channel header body and service mask.
Figure 28:
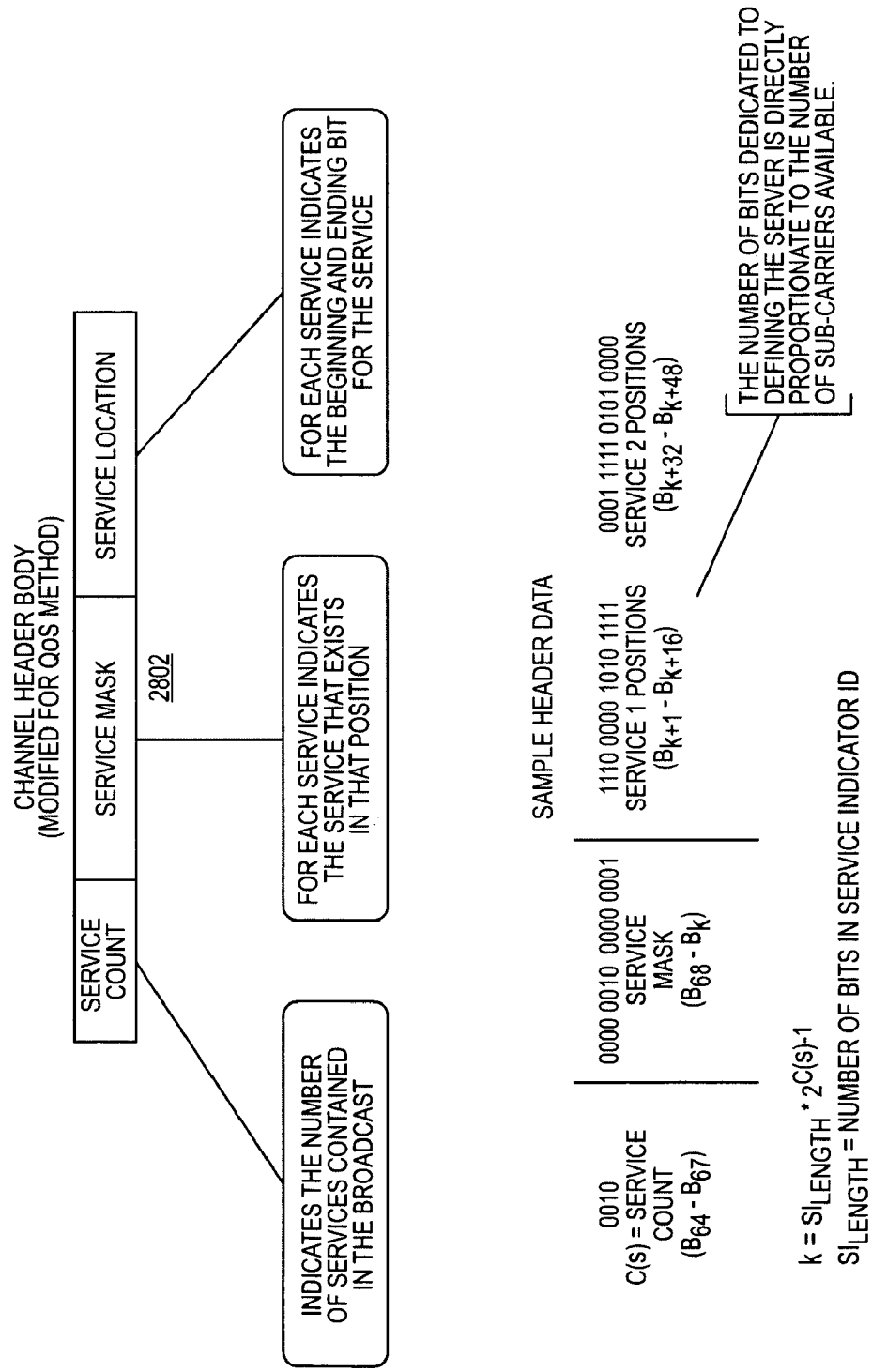
FIG. 28 is an illustration depicting an exemplary channel header body and a Quality of Service filter mask.

After the audio cul-de-sac is recorded, synchronization cues can also be used to trigger the cul-de-sac so that the audio file is played. FIG. 26 is a flowchart depicting the operation for using a synchronization cue to trigger an audio cul-de-sac. The user device 140 first begins by waiting for a synchronization cue at step 2610. After a cue is received, a determination is made at step 2620 as to ascertain if the received cue is a playing cue. If not, then the user device 140 returns to waiting for a cue at step 2610. If so, then the cue is read and the file ID contained within the cue is determined at step 2630. A search is performed at step 2640 to find a recorded audio file that has a file ID matching the one found in the playing cue. If an audio file is found at step 2650, then the file is played at step 2660. If not, then the receiver returns to waiting for a cue at step 2610.

In one non-limiting example embodiment, text and other media may be substituted for the audio data in the audio cul-de-sac. For example, a broadcaster may use a synchronization queue to synchronize piece of text to broadcast.

Although the invention has been described in detail in the foregoing embodiments, it is to be understood that the above descriptions have been provided for purposes of illustration only and that other variations both in form and detail can be made thereupon by those skilled in the art without departing from the spirit and scope of the invention, which is defined solely by the appended claims.

What is claimed is:

1. A method comprising:
   identifying a set of audio data to be sent to a receiver using an RF channel as part of a one-way audio broadcast;
   identifying digital data corresponding to the set of audio data;
   transmitting a first packet to the receiver using an in-band, on-channel format as part of the one-way audio broadcast, wherein the first packet comprises a first header comprising a start recording cue;
   transmitting at least one intermediate packet comprising a payload for later playback, wherein the payload is recorded by the receiver;
   transmitting a second packet to the receiver, wherein the second packet comprises a second header comprising an end recording cue; and
   transmitting a third packet to the receiver, wherein the third packet comprises a synchronization cue that triggers playback of the payload previously recorded.

2. The method of claim 1 wherein identifying digital data corresponding to the set of audio data comprises identifying multimedia information for display on the receiver.

3. The method of claim 1 wherein the payload comprises multimedia information for display on the receiver.

4. The method of claim 1 further comprising transmitting the set of audio data to the receiver using the RF channel as part of the one-way audio broadcast.

5. The method of claim 1 further comprising determining authentication data for allowing the receiver to authenticate one or more of the packets.

6. The method of claim 5 further comprising transmitting the authentication data to the receiver.

7. The method of claim 5 wherein the authentication data includes at least one of a time stamp and nonce information.

8. The method of claim 1 further comprising encrypting one or more of the packets with a public key.

9. The method of claim 1 further comprising determining a file size of one or more of the packets.

10. The method of claim 9 further comprising selecting at least one RF carrier of a central analog frequency based on the file size.

11. The method of claim 10 further comprising transmitting on the at least one RF carrier.

12. A method comprising:
    receiving a first packet at a receiver using an in-band, on-channel format as part of a one-way audio broadcast, wherein the first packet comprises a first header comprising a start recording cue;
    receiving at the receiver at least one intermediate packet comprising a payload for later playback;
    recording the payload at the receiver;
    receiving a second packet at the receiver, wherein the second packet comprises a second header comprising an end recording cue;
    stopping recording of the payload;
    receiving a third packet at the receiver, wherein the third packet comprises a synchronization cue that triggers playback of the previously recorded payload; and
    playing the payload.

13. A system comprising:
    a control system adapted to:
        identify a set of audio data to be sent to a receiver using an RF channel as part of a one-way audio broadcast; and
        identify digital data corresponding to the set of audio data; and
    a transmitter adapted to:
        transmit a first packet to the receiver using an in-band, on-channel format as part of the one-way audio broadcast, wherein the first packet comprises a first header comprising a start recording cue;
        transmit at least one intermediate packet comprising a payload for later playback, wherein the payload is recorded by the receiver;
        transmit a second packet to the receiver, wherein the second packet comprises a second header comprising an end recording cue; and
        transmit a third packet to the receiver, wherein the third packet comprises a synchronization cue that triggers playback of the previously recorded payload.

14. A receiver comprising:
    an antenna;
    receiver circuitry;
    a speaker for outputting an audio signal;
    a display for outputting multimedia content; and
    a control system adapted to:
        process a first packet received through the antenna and receiver circuitry using an in-band, on-channel format as part of a one-way audio broadcast, wherein the first packet comprises a first header comprising a start recording cue;
        process at least one intermediate packet comprising a payload for later playback, wherein the at least one intermediate packet was received through the antenna and receiver circuitry;
        record the payload at the receiver;

process a second packet received through the antenna and receiver circuitry, wherein the second packet comprises a second header comprising an end recording cue;

stop recording of the payload;

process a third packet received through the antenna and receiver circuitry, wherein the third packet comprises a synchronization cue that triggers playback of the previously recorded payload; and playing the payload to an end user through at least one of the speakers and display.

15. A receiver comprising:
a user interface comprising:
  a speaker adapted to play a one-way audio broadcast;
  an output adapted to present multimedia content to a user; and
  one or more input devices adapted to receive input from the user; and
a control system operatively coupled to the user interface and adapted to:
  receive the one-way audio broadcast through an RF channel;
  process the one-way audio broadcast into a set of broadcast data to be presented to the user through the speaker;
  process the one-way audio broadcast to extract digital data from an in-band, on-channel signal;
  evaluate the digital data to extract a trigger event and multimedia content;
  detect a user-initiated trigger corresponding to the trigger event; and
  present the multimedia content to the user through the output in response to detection of the trigger.

16. The receiver of claim 15 wherein the output comprises a display, and the control system is adapted to present the multimedia content to the user at least in part through the display.

17. The receiver of claim 15 wherein the output comprises the speaker, and the control system is adapted to present the multimedia content to the user at least in part through the speaker.

18. A receiver comprising:
a user interface comprising:
  a speaker adapted to play a one-way audio broadcast;
  an output adapted to present multimedia content to a user; and
  one or more input devices adapted to receive input from the user; and
a control system operatively coupled to the user interface and adapted to:
  receive the one-way audio broadcast through an RF channel;
  receive a data packet through an in-band, on-channel format, the data packet comprising:
    digital data; and
    event data;
  extract the digital data and the event data from the data packet;
  playback the one-way audio broadcast through the speaker; and
  present the digital data to the user through the output in response to occurrence of a trigger event corresponding to the event data such that the event is used to synchronize the digital data with the one-way audio broadcast.

* * * * *